United States Patent
Reiche, III et al.

(10) Patent No.: US 10,561,945 B2
(45) Date of Patent: Feb. 18, 2020

(54) METHODS AND SYSTEMS FOR INCENTIVIZING TEAM COOPERATION IN MULTIPLAYER GAMING ENVIRONMENTS

(71) Applicant: Activision Publishing, Inc., Santa Monica, CA (US)

(72) Inventors: Paul Reiche, III, Novato, CA (US); Robert F. Ford, Novato, CA (US); Adrian M. Ledda, San Francisco, CA (US); Paul D. Yan, Novato, CA (US); Daniel J. Neil, San Francisco, CA (US); Michael D. Ebert, Petaluma, CA (US); Avery Lodato, San Rafael, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 15/717,549

(22) Filed: Sep. 27, 2017

(65) Prior Publication Data
US 2019/0091577 A1 Mar. 28, 2019

(51) Int. Cl.
A63F 13/67 (2014.01)
A63F 13/52 (2014.01)
A63F 13/35 (2014.01)
A63F 13/847 (2014.01)

(52) U.S. Cl.
CPC ............. *A63F 13/67* (2014.09); *A63F 13/52* (2014.09); *A63F 13/35* (2014.09); *A63F 13/847* (2014.09)

(58) Field of Classification Search
None
See application file for complete search history.

(56) References Cited

U.S. PATENT DOCUMENTS

| | | | |
|---|---|---|---|
| 4,461,301 | A | 7/1984 | Ochs |
| 4,908,761 | A | 3/1990 | Tai |
| 5,031,089 | A | 7/1991 | Liu |
| 5,058,180 | A | 10/1991 | Khan |
| 5,365,360 | A | 11/1994 | Torres |
| 5,371,673 | A | 12/1994 | Fan |
| 5,432,934 | A | 7/1995 | Levin |
| 5,442,569 | A | 8/1995 | Osano |
| 5,493,692 | A | 2/1996 | Theimer |
| 5,497,186 | A | 3/1996 | Kawasaki |
| 5,530,796 | A | 6/1996 | Wang |

(Continued)

FOREIGN PATENT DOCUMENTS

| | | |
|---|---|---|
| AU | 2005215048 | 10/2011 |
| CA | 2143874 | 6/2000 |

(Continued)

OTHER PUBLICATIONS

Office Action dated Mar. 24, 2017 for U.S. Appl. No. 14/712,514.

(Continued)

*Primary Examiner* — Damon J Pierce
(74) *Attorney, Agent, or Firm* — Novel IP

(57) ABSTRACT

Computer-implemented methods and systems for simulating a multiplayer game environment to allow players of different skill levels to concurrently play the same level of a gaming session, to encourage and incentivize cooperative team behavior, to match players based on subjective variables, such as likeability and a general fun factor, and to tailor gaming content based on the social group itself.

21 Claims, 14 Drawing Sheets

(56) References Cited

U.S. PATENT DOCUMENTS

| | | |
|---|---|---|
| 5,539,883 A | 7/1996 | Allon |
| 5,561,736 A | 10/1996 | Moore |
| 5,563,946 A | 10/1996 | Cooper |
| 5,606,702 A | 2/1997 | Diel |
| 5,630,129 A | 5/1997 | Wheat |
| 5,685,775 A | 11/1997 | Bakoglu |
| 5,694,616 A | 12/1997 | Johnson |
| 5,706,507 A | 1/1998 | Schloss |
| 5,708,764 A | 1/1998 | Borrel |
| 5,726,883 A | 3/1998 | Levine |
| 5,736,985 A | 4/1998 | Lection |
| 5,736,990 A | 4/1998 | Barrus |
| 5,737,416 A | 4/1998 | Cooper |
| 5,745,113 A | 4/1998 | Jordan |
| 5,745,678 A | 4/1998 | Herzberg |
| 5,758,079 A | 5/1998 | Ludwig |
| 5,761,083 A | 6/1998 | Brown |
| 5,762,552 A | 6/1998 | Vuong |
| 5,768,511 A | 6/1998 | Galvin |
| 5,774,668 A | 6/1998 | Choquier |
| 5,793,365 A | 8/1998 | Tang |
| 5,825,877 A | 10/1998 | Dan |
| 5,828,839 A | 10/1998 | Moncreiff |
| 5,835,692 A | 11/1998 | Cragun |
| 5,860,137 A | 1/1999 | Raz |
| 5,877,763 A | 3/1999 | Berry |
| 5,878,233 A | 3/1999 | Schloss |
| 5,880,731 A | 3/1999 | Liles |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,920,692 A | 7/1999 | Nguyen |
| 5,920,848 A | 7/1999 | Schutzer |
| 5,923,324 A | 7/1999 | Berry |
| 5,926,100 A | 7/1999 | Escolar |
| 5,933,818 A | 8/1999 | Kasravi |
| 5,938,722 A | 8/1999 | Johnson |
| 5,958,014 A | 9/1999 | Cave |
| 5,969,724 A | 10/1999 | Berry |
| 5,977,979 A | 11/1999 | Clough |
| 5,983,003 A | 11/1999 | Lection |
| 5,990,887 A | 11/1999 | Redpath |
| 5,990,888 A | 11/1999 | Blades |
| 6,006,223 A | 12/1999 | Agrawal |
| 6,008,848 A | 12/1999 | Tiwari |
| 6,009,455 A | 12/1999 | Doyle |
| 6,012,096 A | 1/2000 | Link et al. |
| 6,014,145 A | 1/2000 | Bardon |
| 6,018,734 A | 1/2000 | Zhang |
| 6,021,268 A | 2/2000 | Johnson |
| 6,021,496 A | 2/2000 | Dutcher |
| 6,023,729 A | 2/2000 | Samuel |
| 6,025,839 A | 2/2000 | Schell |
| 6,032,129 A | 2/2000 | Greef |
| 6,049,819 A | 4/2000 | Buckle |
| 6,058,266 A | 5/2000 | Megiddo |
| 6,059,842 A | 5/2000 | Dumarot |
| 6,061,722 A | 5/2000 | Lipa |
| 6,067,355 A | 5/2000 | Lim |
| 6,069,632 A | 5/2000 | Mullaly |
| 6,070,143 A | 5/2000 | Barney |
| 6,076,093 A | 6/2000 | Pickering |
| 6,081,270 A | 6/2000 | Berry |
| 6,081,271 A | 6/2000 | Bardon |
| 6,088,727 A | 7/2000 | Hosokawa |
| 6,088,732 A | 7/2000 | Smith |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,108,420 A | 8/2000 | Larose |
| 6,111,581 A | 8/2000 | Berry |
| 6,115,718 A | 9/2000 | Huberman |
| 6,134,588 A | 10/2000 | Guenthner |
| 6,138,128 A | 10/2000 | Perkowitz |
| 6,141,699 A | 10/2000 | Luzzi |
| 6,144,381 A | 11/2000 | Lection |
| 6,148,294 A | 11/2000 | Beyda |
| 6,148,328 A | 11/2000 | Cuomo |
| 6,157,953 A | 12/2000 | Chang |
| 6,177,932 B1 | 1/2001 | Galdes |
| 6,179,713 B1 | 1/2001 | James |
| 6,182,067 B1 | 1/2001 | Presnell |
| 6,185,614 B1 | 2/2001 | Cuomo |
| 6,195,657 B1 | 2/2001 | Rucker |
| 6,199,067 B1 | 3/2001 | Geller |
| 6,201,881 B1 | 3/2001 | Masuda |
| 6,212,494 B1 | 4/2001 | Boguraev |
| 6,212,548 B1 | 4/2001 | Desimone |
| 6,216,098 B1 | 4/2001 | Clancey |
| 6,222,551 B1 | 4/2001 | Schneider |
| 6,226,686 B1 | 5/2001 | Rothschild |
| 6,233,583 B1 | 5/2001 | Hoth |
| 6,249,779 B1 | 6/2001 | Hitt |
| 6,266,649 B1 | 7/2001 | Linden |
| 6,271,842 B1 | 8/2001 | Bardon |
| 6,271,843 B1 | 8/2001 | Lection |
| 6,275,820 B1 | 8/2001 | Navin-Chandra |
| 6,282,547 B1 | 8/2001 | Hirsch |
| 6,293,865 B1 | 9/2001 | Kelly |
| 6,301,609 B1 | 10/2001 | Aravamudan et al. |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,127 B1 | 12/2001 | Bieganski |
| 6,334,141 B1 | 12/2001 | Varma |
| 6,336,134 B1 | 1/2002 | Varma |
| 6,337,700 B1 | 1/2002 | Kinoe |
| 6,345,264 B1 | 2/2002 | Breese |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,360,254 B1 | 3/2002 | Linden |
| 6,363,174 B1 | 3/2002 | Lu |
| 6,370,560 B1 | 4/2002 | Robertazzi |
| 6,396,513 B1 | 5/2002 | Helfman |
| 6,411,312 B1 | 6/2002 | Sheppard |
| 6,418,424 B1 | 7/2002 | Hoffberg |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,463,078 B1 | 10/2002 | Engstrom |
| 6,466,550 B1 | 10/2002 | Foster |
| 6,469,712 B1 | 10/2002 | Hilpert, Jr. |
| 6,473,085 B1 | 10/2002 | Brock |
| 6,473,103 B1 | 10/2002 | Bailey |
| 6,473,597 B1 | 10/2002 | Johnson |
| 6,476,830 B1 | 11/2002 | Farmer |
| 6,499,053 B1 | 12/2002 | Marquette |
| 6,501,834 B1 | 12/2002 | Milewski |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,559,863 B1 | 5/2003 | Megiddo |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,594,673 B1 | 7/2003 | Smith |
| 6,601,084 B1 | 7/2003 | Bhaskaran |
| 6,618,751 B1 | 9/2003 | Challenger |
| 6,640,230 B1 | 10/2003 | Alexander |
| 6,641,481 B1 | 11/2003 | Mai |

(56) References Cited

U.S. PATENT DOCUMENTS

| | | |
|---|---|---|
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,742,032 B1 | 5/2004 | Castellani |
| 6,765,596 B2 | 7/2004 | Lection |
| 6,781,607 B1 | 8/2004 | Benham |
| 6,801,930 B1 | 10/2004 | Dionne |
| 6,807,562 B1 | 10/2004 | Pennock |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,854,007 B1 | 2/2005 | Hammond |
| 6,886,026 B1 | 4/2005 | Hanson |
| 6,901,379 B1 | 5/2005 | Balter |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,031,473 B2 | 4/2006 | Morais |
| 7,050,868 B1 | 5/2006 | Graepel |
| 7,062,533 B2 | 6/2006 | Brown |
| 7,089,266 B2 | 8/2006 | Stolte |
| 7,124,071 B2 | 10/2006 | Rich |
| 7,124,164 B1 | 10/2006 | Chemtob |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |
| 7,192,352 B2 | 3/2007 | Walker |
| 7,209,137 B2 | 4/2007 | Brokenshire |
| 7,230,616 B2 | 6/2007 | Taubin |
| 7,240,093 B1 | 7/2007 | Danieli |
| 7,249,123 B2 | 7/2007 | Elder |
| 7,263,511 B2 | 8/2007 | Bodin |
| 7,278,108 B2 | 10/2007 | Duarte |
| 7,287,053 B2 | 10/2007 | Bodin |
| 7,292,870 B2 | 11/2007 | Heredia |
| 7,305,438 B2 | 12/2007 | Christensen |
| 7,308,476 B2 | 12/2007 | Mannaru |
| 7,314,411 B2 | 1/2008 | Lannert |
| 7,328,242 B1 | 2/2008 | McCarthy |
| 7,353,295 B1 | 4/2008 | Crow |
| 7,376,474 B2 | 5/2008 | Graepel |
| 7,383,307 B2 | 6/2008 | Kirkland |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,509,388 B2 | 3/2009 | Allen |
| 7,515,136 B1 | 4/2009 | Kanevsky |
| 7,525,964 B2 | 4/2009 | Astley |
| 7,527,191 B2 | 5/2009 | Takayama |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,614,955 B2 | 11/2009 | Farnham |
| 7,617,283 B2 | 11/2009 | Aaron |
| 7,640,587 B2 | 12/2009 | Fox |
| 7,667,701 B2 | 2/2010 | Leah |
| 7,677,970 B2 | 3/2010 | O'Kelley, II |
| 7,698,656 B2 | 4/2010 | Srivastava |
| 7,702,730 B2 | 4/2010 | Spataro |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,770,114 B2 | 8/2010 | Sriprakash |
| 7,773,087 B2 | 8/2010 | Fowler |
| 7,774,407 B2 | 8/2010 | Daly |
| 7,780,525 B2 | 8/2010 | Walker |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,844,673 B2 | 11/2010 | Bostick |
| 7,846,024 B2 | 12/2010 | Graepel |
| 7,847,799 B2 | 12/2010 | Taubin |
| 7,853,594 B2 | 12/2010 | Elder |
| 7,856,469 B2 | 12/2010 | Chen |
| 7,865,393 B2 | 1/2011 | Leason |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,955,171 B2 | 6/2011 | Jorasch |
| 7,970,837 B2 | 6/2011 | Lyle |
| 7,970,840 B2 | 6/2011 | Cannon |
| 7,985,132 B2 | 7/2011 | Walker |
| 7,985,138 B2 | 7/2011 | Acharya |
| 7,990,387 B2 | 8/2011 | Hamilton, II |
| 7,996,164 B2 | 8/2011 | Hamilton, II |
| 7,997,987 B2 | 8/2011 | Johnson |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |

(56) References Cited

U.S. PATENT DOCUMENTS

| | | |
|---|---|---|
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland et al. |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,489,925 B1 | 7/2013 | Antukh |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,696,465 B2 | 4/2014 | Gatto |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,795,887 B2 | 10/2017 | Lin |
| 9,808,722 B2 | 11/2017 | Kawachiya |
| 9,827,488 B2 | 11/2017 | Pearce |
| 9,942,013 B2 | 4/2018 | Malladi |
| 2001/0032240 A1 | 10/2001 | Malone |
| 2002/0002514 A1 | 1/2002 | Kamachi |
| 2002/0007319 A1 | 1/2002 | Yu |
| 2002/0026388 A1 | 2/2002 | Roebuck |
| 2002/0035480 A1 | 3/2002 | Gordon |
| 2002/0035593 A1 | 3/2002 | Salim |
| 2002/0043568 A1 | 4/2002 | Hess |
| 2002/0065870 A1 | 5/2002 | Baehr-Jones |
| 2002/0095586 A1 | 7/2002 | Doyle |
| 2002/0096831 A1 | 7/2002 | Nakayama |
| 2002/0097856 A1 | 7/2002 | Wullert |
| 2002/0116466 A1 | 8/2002 | Trevithick |
| 2002/0124137 A1 | 9/2002 | Ulrich |
| 2002/0130904 A1 | 9/2002 | Becker |
| 2002/0135618 A1 | 9/2002 | Maes |
| 2002/0169665 A1 | 11/2002 | Hughes |
| 2002/0184373 A1 | 12/2002 | Maes |
| 2002/0184391 A1 | 12/2002 | Phillips |
| 2002/0188688 A1 | 12/2002 | Bice |
| 2003/0008712 A1 | 1/2003 | Poulin |
| 2003/0014297 A1 | 1/2003 | Kaufman |
| 2003/0032476 A1 | 2/2003 | Walker |
| 2003/0050977 A1 | 3/2003 | Puthenkulam |
| 2003/0055892 A1 | 3/2003 | Huitema |
| 2003/0056002 A1 | 3/2003 | Trethewey |
| 2003/0076353 A1 | 4/2003 | Blackstock |
| 2003/0101343 A1 | 5/2003 | Eaton |
| 2003/0112952 A1 | 6/2003 | Brown |
| 2003/0135621 A1 | 7/2003 | Romagnoli |
| 2003/0141977 A1 | 7/2003 | Brown |
| 2003/0145128 A1 | 7/2003 | Baird |
| 2003/0149675 A1 | 8/2003 | Ansari |
| 2003/0177187 A1 | 9/2003 | Levine |
| 2003/0195957 A1 | 10/2003 | Banginwar |
| 2003/0210265 A1 | 11/2003 | Haimberg |
| 2004/0014514 A1 | 1/2004 | Yacenda |
| 2004/0054667 A1 | 3/2004 | Kake |
| 2004/0059781 A1 | 3/2004 | Yoakum |
| 2004/0078432 A1 | 4/2004 | Manber |
| 2004/0078596 A1 | 4/2004 | Kent |
| 2004/0088303 A1 | 5/2004 | Elder |
| 2004/0097287 A1 | 5/2004 | Postrel |
| 2004/0103079 A1 | 5/2004 | Tokusho |
| 2004/0113756 A1 | 6/2004 | Mollenkopf |
| 2004/0127277 A1 | 7/2004 | Walker |
| 2004/0128181 A1 | 7/2004 | Zurko |
| 2004/0172339 A1 | 9/2004 | Snelgrove |
| 2004/0174392 A1 | 9/2004 | Bjoernsen |
| 2004/0186886 A1 | 9/2004 | Galli et al. |
| 2004/0205134 A1 | 10/2004 | Digate |

(56) References Cited

U.S. PATENT DOCUMENTS

| | | |
|---|---|---|
| 2004/0210627 A1 | 10/2004 | Kroening |
| 2004/0228291 A1 | 11/2004 | Huslak |
| 2004/0244006 A1 | 12/2004 | Kaufman |
| 2004/0260771 A1 | 12/2004 | Gusler et al. |
| 2005/0015571 A1 | 1/2005 | Kaufman |
| 2005/0021484 A1 | 1/2005 | Bodin |
| 2005/0027696 A1 | 2/2005 | Swaminathan |
| 2005/0050137 A1 | 3/2005 | Bodin |
| 2005/0060368 A1 | 3/2005 | Wang |
| 2005/0071428 A1 | 3/2005 | Khakoo |
| 2005/0071462 A1 | 3/2005 | Bodin |
| 2005/0080859 A1 | 4/2005 | Lake |
| 2005/0091380 A1 | 4/2005 | Gonen |
| 2005/0097440 A1 | 5/2005 | Lusk |
| 2005/0132009 A1 | 6/2005 | Solie |
| 2005/0138108 A1 | 6/2005 | Galvin |
| 2005/0149620 A1 | 7/2005 | Kirkland |
| 2005/0165893 A1 | 7/2005 | Feinberg |
| 2005/0216346 A1 | 9/2005 | Kusumoto |
| 2005/0223075 A1 | 10/2005 | Swearingen et al. |
| 2005/0246711 A1 | 11/2005 | Berstis |
| 2005/0277472 A1 | 12/2005 | Gillan |
| 2006/0003305 A1 | 1/2006 | Kelmar |
| 2006/0004659 A1 | 1/2006 | Hutchison |
| 2006/0026253 A1 | 2/2006 | Kessen |
| 2006/0031322 A1 | 2/2006 | Kessen |
| 2006/0031326 A1 | 2/2006 | Ovenden |
| 2006/0036688 A1 | 2/2006 | McMahan |
| 2006/0121990 A1 | 6/2006 | O'Kelley |
| 2006/0128460 A1 | 6/2006 | Muir |
| 2006/0129643 A1 | 6/2006 | Nielson |
| 2006/0155813 A1 | 7/2006 | Dietz et al. |
| 2006/0161852 A1 | 7/2006 | Chen |
| 2006/0178968 A1 | 8/2006 | Jung |
| 2006/0184260 A1 | 8/2006 | Graepel |
| 2006/0190591 A1 | 8/2006 | Bobde |
| 2006/0252526 A1 | 11/2006 | Walker |
| 2006/0258463 A1 | 11/2006 | Cugno |
| 2007/0026934 A1 | 2/2007 | Herbrich |
| 2007/0066403 A1 | 3/2007 | Conkwright |
| 2007/0073582 A1 | 3/2007 | Jung |
| 2007/0087835 A1* | 4/2007 | Van Luchene .......... A63F 13/12 463/43 |
| 2007/0106526 A1 | 5/2007 | Jung |
| 2007/0111789 A1 | 5/2007 | van Deursen |
| 2007/0112624 A1 | 5/2007 | Jung |
| 2007/0112706 A1 | 5/2007 | Herbrich |
| 2007/0117623 A1 | 5/2007 | Nelson |
| 2007/0130001 A1 | 6/2007 | Jung |
| 2007/0168444 A1 | 7/2007 | Chen |
| 2007/0168447 A1 | 7/2007 | Chen |
| 2007/0180040 A1 | 8/2007 | Etgen |
| 2007/0265718 A1 | 11/2007 | Graepel |
| 2007/0298867 A1 | 12/2007 | Huang |
| 2008/0019353 A1 | 1/2008 | Foote |
| 2008/0059304 A1 | 3/2008 | Kimsey |
| 2008/0064467 A1 | 3/2008 | Reiner |
| 2008/0113815 A1 | 5/2008 | Weingardt |
| 2008/0126350 A1 | 5/2008 | Shoemaker |
| 2008/0155019 A1 | 6/2008 | Wallace |
| 2008/0176655 A1 | 7/2008 | James |
| 2008/0207329 A1 | 8/2008 | Wallace |
| 2008/0214287 A1 | 9/2008 | Lutnick |
| 2008/0242420 A1 | 10/2008 | Graepel |
| 2008/0254893 A1 | 10/2008 | Patel |
| 2008/0270605 A1 | 10/2008 | Berstis |
| 2008/0270916 A1 | 10/2008 | Chen |
| 2008/0301405 A1 | 12/2008 | Kaufman |
| 2009/0005172 A1 | 1/2009 | Shibahara |
| 2009/0075738 A1 | 3/2009 | Pearce |
| 2009/0113448 A1 | 4/2009 | Smith |
| 2009/0137320 A1 | 5/2009 | Kimura |
| 2009/0253494 A1 | 10/2009 | Fitch |
| 2009/0325711 A1 | 12/2009 | Bronstein |
| 2010/0306672 A1 | 12/2010 | McEniry |
| 2011/0190063 A1 | 8/2011 | Kajii |
| 2012/0021825 A1 | 1/2012 | Harp |
| 2013/0296046 A1 | 11/2013 | Mianji |
| 2014/0004955 A1 | 1/2014 | Nahari |
| 2014/0004960 A1 | 1/2014 | Soti |
| 2014/0011595 A1 | 1/2014 | Muller |
| 2014/0162763 A1 | 6/2014 | Kim |
| 2014/0162781 A1 | 6/2014 | Butler |
| 2014/0274402 A1 | 9/2014 | Michel |
| 2014/0344725 A1 | 11/2014 | Bates |
| 2014/0349753 A1 | 11/2014 | Imai |
| 2015/0038233 A1 | 2/2015 | Rom |
| 2015/0310698 A1 | 10/2015 | Polis |
| 2016/0001181 A1 | 1/2016 | Marr |
| 2016/0001182 A1 | 1/2016 | Marr |
| 2016/0001186 A1 | 1/2016 | Marr |
| 2016/0005270 A1 | 1/2016 | Marr |
| 2016/0191671 A1 | 6/2016 | Dawson |
| 2016/0296840 A1 | 10/2016 | Kaewell |

FOREIGN PATENT DOCUMENTS

| | | |
|---|---|---|
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 1209849 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H11191097 A | 4/1999 |
| JP | 11191097 | 7/1999 |
| JP | 3033956 B2 | 4/2000 |
| JP | 3124916 B2 | 1/2001 |
| JP | 2001119403 A | 4/2001 |
| JP | 3177221 B2 | 6/2001 |
| JP | 2001204973 A | 7/2001 |
| JP | 3199231 B2 | 8/2001 |
| JP | 2001230883 A | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3503774 | 12/2003 |
| JP | 2004062539 A | 2/2004 |
| JP | 3579154 B2 | 10/2004 |
| JP | 3701773 B2 | 10/2005 |
| JP | 5550720 B2 | 7/2014 |
| JP | 2015002839 A | 1/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |

(56) References Cited

FOREIGN PATENT DOCUMENTS

| | | |
|---|---|---|
| TW | 200836091 | 9/2008 |
| WO | 0060444 A1 | 10/2000 |
| WO | 0062231 A1 | 10/2000 |
| WO | 0137162 A2 | 5/2001 |
| WO | 0201455 A2 | 1/2002 |
| WO | 0203645 A2 | 1/2002 |
| WO | 2002073457 | 9/2002 |
| WO | 20020087156 | 10/2002 |
| WO | 03044755 A1 | 5/2003 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Office Action dated Jan. 20, 2017 for U.S. Appl. No. 14/712,566.
Notice of Allowance dated Jun. 14, 2017 for U.S. Appl. No. 14/712,566.
Office Action dated Feb. 13, 2017 for U.S. Appl. No. 14/712,541.
Office Action dated Aug. 7, 2017 for U.S. Appl. No. 14/712,541.
Office Action dated Oct. 19, 2017 for U.S. Appl. No. 14/712,514 (pp. 1-12).
Office Action dated Mar. 14, 2018 for U.S. Appl. No. 14/712,541 (pp. 1-16).
Office Action dated Mar. 14, 2018 for U.S. Appl. No. 15/703,757.
Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb-er=1266179.
"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI=http://doi.acm.org/10.1145/566500.566504.
IBM developer Works, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Lee et al., "A Self-Adjusting Data Distribution Mechanism for Multidimensional Load Balancing in Multiprocessor-Based Database Systems," Information Systems vol. 19, No. 7, pp. 549-567, 1994.
Ma et al., "A Scalable Parallel Cell-Projection vol. Rendering Algorithm for Three-Dimensional Unstructured Data", IEEE 1997, pp. 1-10.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
Hassen et al., "A Task-and Data-Parallel Programming Language Based on Shared Objects," ACM Transactions on Programming Languages and Systems, vol. 20, No. 6, Nov. 1998, pp. 1131-1170.
Andert, "A Simulation of Dynamic Task Allocation in a Distributed Computer System," Proceedings of the 1987 Winter Simulation Conference, 1987, pp. 1-9.
Supplementary European Search from the European Patent Office for EP05723458.5, dated Jul. 19, 2010.
International Search Report as Published as WO2005/079538 in corresponding international application No. PCT/US2005/005550. dated Jul. 5, 2006.
K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.
Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.
V. Stojanovic, "Virtual boutique-try clothes on-line", 5th International Conference on Telecommunications in Modern Satellite, Cable and Broadcasting Service. TELSIKS 2001. Proceedings of Papers (Cat. No. 01EX517), 2001, pt. 2, p. 802-3 vol. 2.
Roaming Virtual World Is a Real Trip; [Final Edition] Leslie Walker. The Washington Post. Washington, D.C.: Mar. 30, 2006.
E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.
Kautz, H., B. Selman, M. Shah.. "Referral Web: Combining Social Networks and Collaborative Filtering". Communications of the ACM, vol. 40, No. 3, Mar. 1997.
Schwartz, M. F., D. C. M. Wood. "Discovering shared interests among people using graph analysis of global electronic mail traffic". Department of Computer Science, University of Colorado, Boulder CO. Oct. 1992.
Wellman, B. "For a social network analysis of computer networks: a sociological perspective on collaborative work and virtual community". Proceedings of the 1996 conference on ACM SIGCPR/SIGMIS. 1-11.
Qureshi, S. "Supporting electronic group processes: a social perspective". Proceedings of the 1995 ACM SIGCPR Conference on Supporting teams, groups, and learning inside the IS function. ACM Press. 24-34.
Ackerman, M.S., B. Starr. "Social activity indicators: interface components for CSCW systems". Proceedings of the 8th ACM Symposium on User Interface and Software Technology. ACM Press. 159-168, Nov. 14-17, 1995.
Garton, L., C. Haythornthwaite, B. Wellman. "Studying on-line social networks in Doing Internet Research", Jun. 1997.
Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.
Wang, Y. "Web Mining and Knowledge Discovery of Usage Patterns". CS748T Project (Part I) Feb. 2000.
Sack, W. "Conversation Map: a content-based Usenet newsgroup browser". Proceedings of the 2000 International Conference on Intelligent User Interfaces. ACM Press. 233-240.
Feldman, R. "Mining unstructured data". Tutorial notes for ACK SIGKDD 1999. ACM Press. 182-236.
"Universally Unique Identifier", 2006 (http://en.wikipedia.org/wiki/UUID).
Office Action dated May 24, 2018 for U.S. Appl. No. 14/712,359 (pp. 1-20).
Office Action dated Sep. 21, 2018 for U.S. Appl. No. 14/712,608 (pp. 1-9).
Notice of Allowance dated Dec. 21, 2018 for U.S. Appl. No. 14/712,541 (pp. 1-9).
Notice of Allowance dated Jan. 30, 2019 for U.S. Appl. No. 14/712,359 (pp. 1-8).
Notice of Allowance dated Jan. 30, 2019 for U.S. Appl. No. 14/712,514 (pp. 1-11).

\* cited by examiner

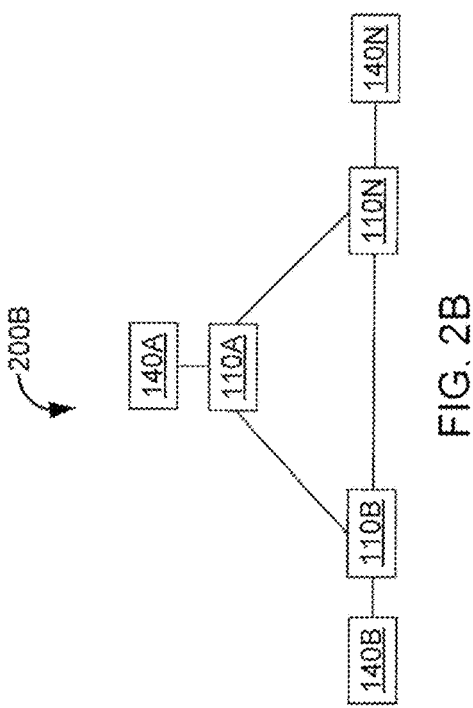
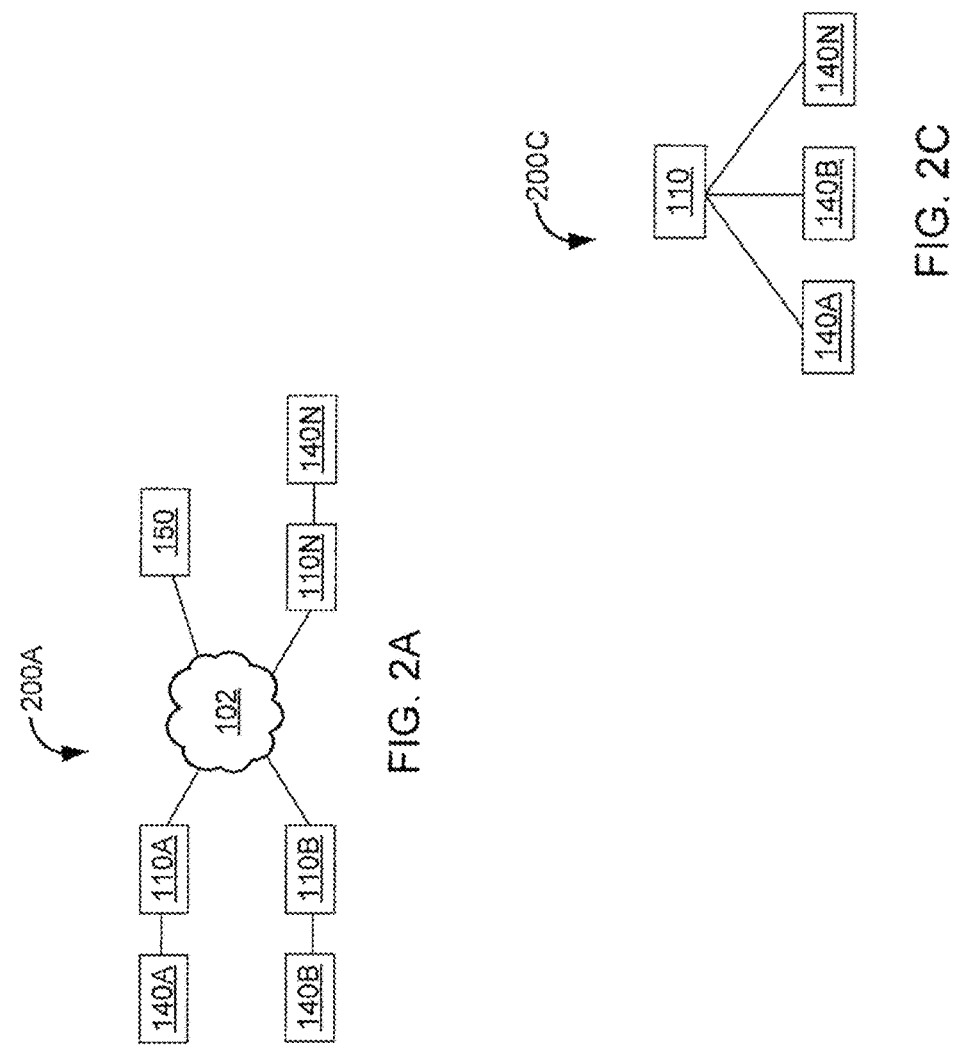

Table 1

| Modifiable Parameters | High Skill Level | Medium Skill Level | Low Skill Level |
|---|---|---|---|
| degree of accuracy required to hit a target | High | Medium | Low |
| Likelihood of being targeted by enemy | High | Medium | Low |
| Difficulty of an in-game puzzle | High | Medium | Low |
| Bonus chance of finding powerful treasure | Medium | High | Very High |
| Number of challenging enemies in a single encounter | 10-20 | 5-10 | 1-5 |
| Gold earned multiplier | x1.5 | x1.25 | X1.0 |
| Friendly-fire damage amount to teammates | 100% of damage | 50% of damage | None |

FIG. 3B

Table 2

| Traits | Modifications to high skill level players | Modifications to low skill level players |
|---|---|---|
| Equipment selection | Access to numerous, complex equipment | Access to fewer, simplified equipment |
| Accuracy of enemy attacks | Enemies attacks never miss the player | Enemies attacks sometimes miss the player |
| Accuracy of player attacks | Player attacks need to be precise to hit the enemy. | Player attacks have a generous leeway and do not need great precision to hit the enemy. |
| Chance to find bonus treasure | 80% chance on session completion | 35% chance on session completion |
| Frequency of hints given to player in a session | No hints given | Hints are always given |
| Customization options | Wide range of unique ways to customize character appearance | Limited range of ways to customize character appearance |

FIG. 3C

Table 3

| Actions | Status of Cooperative Actions performed | Cooperation Metric |
|---|---|---|
| Healing another player | Yes | +5 |
| Sharing weapon | No | 0 |
| Saving a team member's life | Yes | +25 |
| Killing a team member | Yes | -50 |
| Several teammates contributed to defeating an enemy | Yes | +15 per member involved |
| Activating a coordinated team combo attack | Yes | +40 |
| Completing level objectives alone | No | 0 |
| Completing level objectives with teammates | Yes | +10 |
| Complimenting, praising, or positive gestures to other teammates | Yes | +5 |

FIG. 4B

| Actions of Player 1 | Implicit Likeability Metrics with Player 2 | Implicit Likeability Metrics with Player 3 |
|---|---|---|
| quitting a gameplay session before finishing the session | 0 | 0 |
| positive chatting with player 2 during the gameplay session | 1 | 0 |
| co-operating with both players during the gameplay session | 1 | 1 |
| engaging in celebratory behavior with both the other players during/or after the gameplay session | 1 | 1 |

Table 4

FIG. 6B

Table 5

| User Behavior (730) | Modification to Gameplay (732) |
|---|---|
| Members are playing the same level repeatedly | Incentivize a new level by providing special rewards on completion of new level |
| One member earns a new, rare special weapon and posts about it | All other members now have a higher probability of receiving this same weapon |
| Members repeatedly fail a particular mission, and complain about it in messages | The mission becomes offered at a lower difficulty, with slightly reduced rewards. |
| Software notices that Member A and Member B do not play many games together | Software offers in-game incentives to encourage Member A and Member B to play a game together, and earn a unique reward. |
| Software presents a survey to a group, and members vote on their favorite type of weapon | The most-voted weapon becomes more likely to appear as a reward for all group members. |
| A member shares a particularly challenging in-game achievement | Software issues challenges to all members and offers rewards to players who can match or exceed the same challenge. |

FIG. 7B

METHODS AND SYSTEMS FOR INCENTIVIZING TEAM COOPERATION IN MULTIPLAYER GAMING ENVIRONMENTS

FIELD

The present specification discloses systems and methods for improving multiplayer gaming environments. More specifically, the present specification is related to improving player matching, generating content derived from, or based on, social networks, customizing content to a player's skill level, and incentivizing cooperative team behavior within online multiplayer gaming environments.

BACKGROUND

Online gaming platforms enable social interactions between players who may or may not be known to each other. Multiplayer gaming environments often enable players to form teams and therefore foster virtual interaction while they play in the same gaming environment at the same time. Individuals can form partnerships and participate in play against the system via pre-programmed challenges and/or against another team of individuals, thereby allowing for either cooperative or competitive play. Each gameplay session may be played with either the same or a different group of matched players.

Typically, when a player logs into an online multiplayer gaming environment, the player may engage in a gameplay session in which he or she is matched, based on skill, with other players to play together on the same team or as opponents. A given player may engage in multiple gameplay sessions during a login session. In addition, each gameplay session may be played with either the same or a different group of players that are compatible with their individual skill levels. Conventionally, when interested in playing in a group with other players, an individual player may ask other players who are of the same skill level to form a player group. The player may also study profiles of other players and invite them to play together. There are often times when players invite their friends to play together in a game. However, friends may or may not be familiar with the specific game and/or gaming levels within the specific game to which they have been invited. Alternatively, some friends may be familiar with the game but may have different comfort levels and/or levels of proficiency at playing the game. While some players enjoy playing videogames interactively with friends, these differences in skill set, experience or proficiency at a game and/or certain levels within the game may prevent them from playing with the people they would most enjoy playing with.

There is thus a need for a gaming environment that enables players of different skill levels to play together, while still providing players at the various different skill levels the appropriate amount of challenge for their given skill level, thereby avoiding having lower skilled players be overwhelmed or higher skilled players be bored. A gaming environment is needed that enables players within the same team to experience a different degree of difficulty or challenge while participating in the same gameplay session on the same game level.

With respect to team formation or opponent matching itself, different types of matchmaking processes are utilized to connect players for online gaming sessions. Most processes attempt to match based on complimentary gaming skills. Examples of matchmaking elements used may include game profile, player profile, prior match scores, and prior quality scores. Conventionally, when interested in playing in a group with other players, an individual player may ask friends to form a player group, may ask other players who are of the same skill level to form a player group, and/or may otherwise form a group by sending invitations to other players. Some systems may automatically group or match players based solely on a limited number of hard-coded characteristics (e.g., skill level), which are not dynamically adjusted. Such systems may create sets of rigidly segregated pools of players. For example, in some conventional systems, a player who is at a lower skill level may never be matched with a player at a higher skill level, which may result in one dimensional and unsatisfying gameplay. Additionally, prospectively enjoyable gaming partnerships may not be formed between players of different skills due to these pre-defined criteria for matching players. Thus, there is also a need for methods and systems that enable players in a multiplayer gaming environment to play together effectively based on subjective variables, such as a degree of likeability or a fun factor between the players. There is also a need to incorporate stronger social elements in multiplayer games.

Once a team is formed, it would be preferable to encourage and incentivize cooperation among teammates. Such cooperation increases the satisfaction among players and typically results in improved performance. However, conventional gaming environments do not recognize, or quantify, cooperation between team players. Therefore, players are unable to track whether they are taking steps to improve their cooperation and fail to identify, or pay attention to, opportunities to behave cooperatively. Therefore, there is also a need for a gaming environment to recognize team cooperation and encourage cordial team performance through quantified metrics and visual representations thereof.

Some gaming environments allow players to interact with each other, and virtual characters, via social networking platforms. These platforms provide a virtual space to connect with other players with common interests and profiles related to certain gaming environments, are used by the players to discuss their gaming activities and experiences, and often provide a way for players to offer suggestions and feedback that could improve their gaming experiences. Frequently, groups of players, who are connected with each other over a social network and who often play together, have different suggestions and desires for what they wish to see in the gaming environment, and these suggestions and desires may vary greatly between players' various social groups, which have different interests, discussions, suggestions and feedback. While these varied social groups are rich in ideas and content suggestions, conventional gaming systems are unable to efficiently collect and utilize this feedback from each social group to generate different, tailored gaming environments. Therefore, there is also a need for a gaming system and environment that may identify players and/or player groups active over a social network, monitor and track content suggestions made within the social group, and dynamically modify the gaming parameters for that player or group of players within the tracked social group, based on their activities, suggestions, feedback, or other information provided within the social network.

SUMMARY

The following embodiments and aspects thereof are described and illustrated in conjunction with systems, tools and methods, which are meant to be exemplary and illustrative, not limiting in scope.

In some embodiments, the present specification discloses a computer-implemented method for encouraging team performance in a multiplayer game environment in a game for multiple players where the multiple players form the team, the method being implemented in a computer having a processor and a random access memory, wherein the processor is in data communication with a display and with a storage unit, the method comprising: determining, by the computer, a cooperation metric comprising a measure of a degree of cooperation provided by each player of the multiple players; assessing, by the computer, an overall team metric comprising a measure of a degree of cooperation provided collectively by the multiple players that form the team, based on the measure of the degree of cooperation provided by each player; and generating, by the computer, a visual representation of team performance based on the overall team metric.

Optionally, the determining comprises determining a degree of at least one of: items given by at least one player to at least one other player in the team, cooperation extended by at least one player to at least one other player in the team to defeat an enemy in the game, cooperation extended by at least one player to at least one other player in the team to overcome an obstacle in the game, and cooperation extended by at least one player to at least one other player in the team to solve a problem in the game.

Optionally, the assessing further comprises rewarding the team based on the performance of the team. Optionally, the rewarding comprises providing at least one of bonus points, additional weapons, and game benefits, to the team.

In some embodiments, the present specification discloses a system for encouraging team performance in a multiplayer game environment in a game for multiple players where the multiple players form the team, the system comprising: a computer having a processor and a random access memory, wherein the processor is in data communication with a display and with a storage unit, the computer configured to: determining a cooperation metric comprising a measure of a degree of cooperation provided by each player of the multiple players; assessing an overall team metric comprising a measure of a degree of cooperation provided collectively by the multiple players that form the team, based on the measure of the degree of cooperation provided by each player; and generating a visual representation of team performance based on the overall team metric.

Optionally, the determining comprises determining a degree of at least one of: items given by at least one player to at least one other player in the team, cooperation extended by at least one player to at least one other player in the team to defeat an enemy in the game, cooperation extended by at least one player to at least one other player in the team to overcome an obstacle in the game, and cooperation extended by at least one player to at least one other player in the team to solve a problem in the game.

Optionally, the assessing further comprises rewarding the team based on the performance of the team. Optionally, the rewarding comprises providing at least one of bonus points, additional weapons, and game benefits, to the team.

In some embodiments, the present specification discloses a computer readable non-transitory medium comprising a plurality of executable programmatic instructions wherein, when said plurality of executable programmatic instructions are executed by a processor, a process for encouraging team performance in a multiplayer game environment in a game for multiple players where the multiple players form the team, is performed, said plurality of executable programmatic instructions comprising: programmatic instructions, stored in said computer readable non-transitory medium, for determining a cooperation metric comprising a measure of a degree of cooperation provided by each player of the multiple players; programmatic instructions, stored in said computer readable non-transitory medium, for assessing an overall team metric comprising a measure of a degree of cooperation provided collectively by the multiple players that form the team, based on the measure of the degree of cooperation provided by each player; and programmatic instructions, stored in said computer readable non-transitory medium, for generating a visual representation of team performance based on the overall team metric.

Optionally, the determining comprises determining a degree of at least one of: items given by at least one player to at least one other player in the team, cooperation extended by at least one player to at least one other player in the team to defeat an enemy in the game, cooperation extended by at least one player to at least one other player in the team to overcome an obstacle in the game, and cooperation extended by at least one player to at least one other player in the team to solve a problem in the game.

Optionally, the assessing further comprises rewarding the team based on the performance of the team.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein:

FIG. 2A illustrates an exemplary system configuration in which a server hosts a plurality of computer devices to facilitate a multiplayer game, according to an implementation of the present specification;

FIG. 2B illustrates an exemplary system configuration in which a plurality of computer systems are networked together to facilitate a multiplayer game, according to an implementation of the present specification;

FIG. 2C illustrates an exemplary system configuration in which a computer system is used by a plurality of users to facilitate a multiplayer game, according to an implementation of the present specification;

FIG. 3B is a table providing an exemplary list of parameters of a gameplay session that are modified based on a player's skill level and the corresponding experience for players of different skill levels;

FIG. 3C is a table providing an exemplary list of parameters of a gameplay session that are modified differently for different experiences by players based on a player's skill level;

FIG. 4B is a table providing an exemplary list of actions that may be performed by players of a team during a game play session and the corresponding cooperation metrics associated with each of the actions;

FIG. 6B is a table providing a list of exemplary player actions during a gameplay session that may be used for determining likeability metrics with respect to at least one other player;

FIG. 7B is a table providing a list of exemplary user feedback during or after a gameplay session that may be used for modifying one or more gaming levels.

DETAILED DESCRIPTION

Figure 1A:
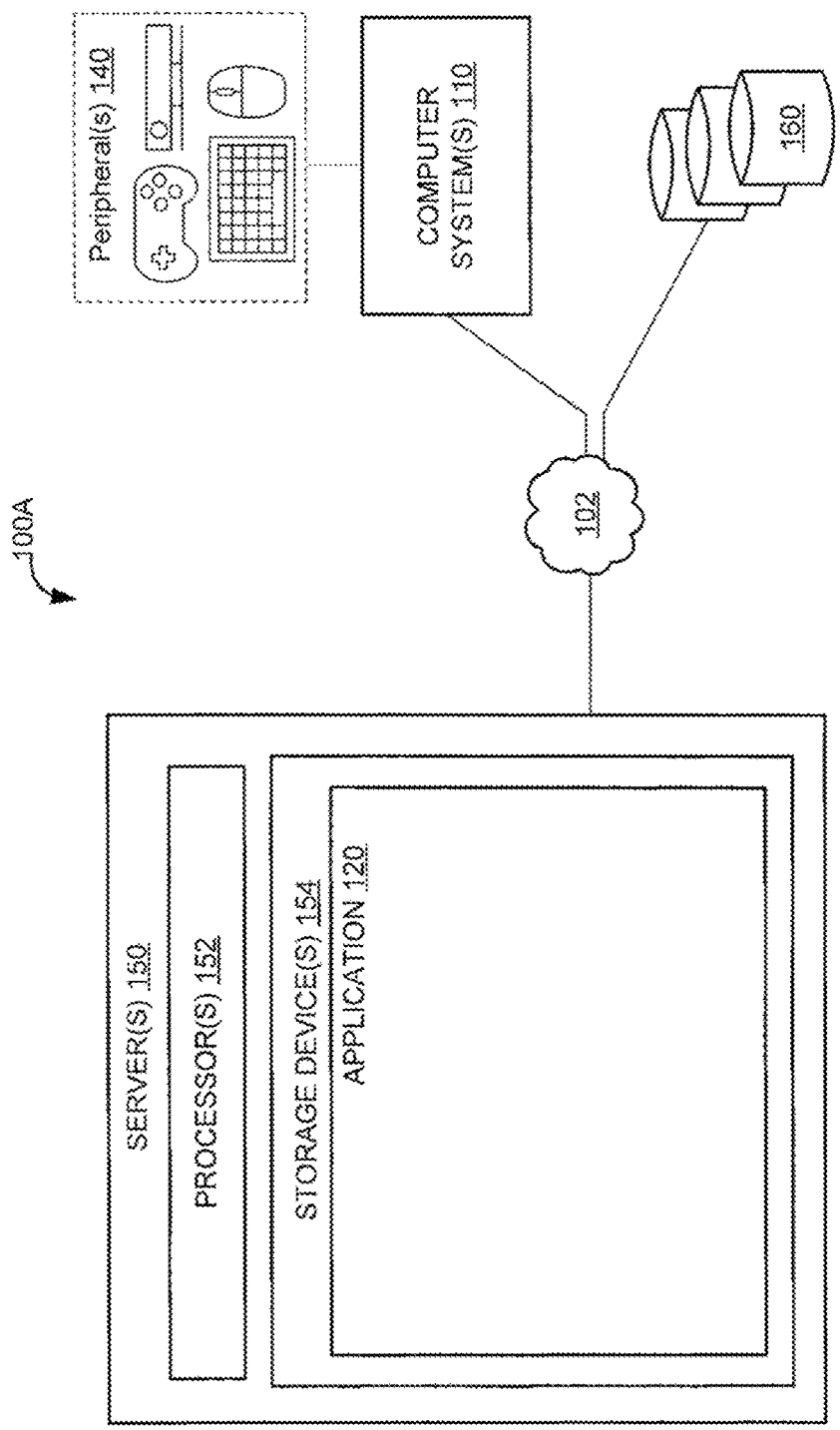
FIG. 1A is a block diagram of a system for providing multiplayer video games, according to one implementation of the present specification.

The present specification relates to dynamically adjusting a gaming environment in real time in order to improve matchmaking systems and methods that facilitate optimization of player matches for multiplayer video games, as well as facilitate friendly social interaction during and after game play. In embodiments of the present specification, the gaming environment may include gaming parameters, display parameters, and parameters related to social media for the players of a game. The systems and methods of the present specification may continually tune the gaming environment and its various parameters based on observations of player behavior, gameplay quality, gaming experiences of individuals as well as a group of players who play together, suggestions from social groups of players, and/or other information.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated.

It should be noted herein that any feature or component described in association with a specific embodiment may be used and implemented with any other embodiment unless clearly indicated otherwise.

It should be appreciated that the programmatic methods described herein may be performed on any computing device, including a laptop, desktop, smartphone, tablet computer, specialized gaming console, or virtual reality system. The computing device comprises at least one processor and a nonvolatile memory that stores the programmatic instructions which, when executed by the processor, perform the methods or steps disclosed herein, including the generation of a graphical user interface that is communicated to a local or remote display. The computing device is in communication with at least one remotely located server through a network of any type.

The embodiments disclosed herein are directed to an improvement in computer-related technology (enabling computers to enable improved gaming experiences in an online multiplayer gaming environment), and thus do not recite abstract ideas or concepts. The improved computing gaming experiences are achieved through the use of specific rules to collect and evaluate player data within the gaming environment which, when executed, enable the automation of specific content generation, player matching, and other gaming experiences that previously were not available or could not be automated. These new computer gaming rules improve existing technological processes in gaming and, therefore, are not abstract or conceptual in nature. This specification therefore teaches how the disclosed inventions improve a gaming technology using a specific set of rules, and particular solutions to the aforementioned failures in conventional gaming systems to achieve the desired outcomes.

While aspects of the present specification may be described herein with reference to various game levels or modes, characters, roles, game items, etc. associated with a First-Person-Shooter (FPS) game, it should be appreciated that any such examples are for illustrative purposes only, and are not intended to be limiting. The matchmaking system and method described in detail herein may be used in any genre of multiplayer video game, without limitation.

The terminology used within this specification and detailed description of the various embodiments is for the purpose of describing particular embodiments only and is not intended to limit the invention.

As used herein, the term "a degree of" may be construed to mean a measure calculated by a processing device to a certain parameter, and used to assist in inferring an extent of that parameter.

The terms "skill level" and "skill level data" may be construed to mean a relative measure or a statistic and/or associated data used to arrive at the measure or statistic, established by a processor, which is used to determine an ability of a player in playing a game, when compared to other players and/or when compared to the ability of an expert or reference player.

The term "modifying parameters of a game session" may be construed to mean a technical process of using a processor to change data entries which are used by the processor of a gaming console or gaming server in the process of programmatically generating one or more levels of a gameplay session.

The term "a degree of difficulty or challenge" may be construed to mean a technical process of using a processor to select, by a player, the technical difficulty of performing a task such as playing a game in order to achieve a score in the game.

The term "common level in a game session" may be construed to mean a portion of a game that is commonly presented by the processor of a gaming console or gaming server to all the players who are playing the game together and simultaneously.

The term "explicit indicator of likeability between a first player and a second player" may refer to data determined by a processor of a gaming console or gaming server from data provided by a first player towards a second player, which indicates that the first player likes or is favorable toward the second player or vice versa.

The term "implicit indicator of likeability between a first player and a second player" may refer to data determined by a processor of a gaming console or gaming server interpreted from one or more data sets collected by the processor from the actions of a first player towards a second player, which indicate that the first player likes or is favorable to the second player or vice versa.

The term "a level of cooperation between a first player and a second player" may be construed to mean an extent of assistance provided by the two players to each other through one or more actions that are directed towards achieving a common or mutual benefit during a gaming session where the two players are playing together and/or simultaneously.

The term "celebratory actions" may be construed to mean one or more data points in the form of graphics, text, or voice, that may be used to acknowledge enjoyment or achievement of an event during or after a gaming session by one or more players engaged in that gaming session.

The term "positive or negative chatting between a first player and a second player" may be construed to mean data exchanged between the first and the second players towards each other that may be in the form of text, graphics, and/or voice, and that are indicative of either a favorable or a cynical viewpoint directed from one player to the other.

The term "a multiplayer game environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multiplayer game environment or massively multiplayer online game is a computer-related technology, a non-generic technological environment, and should not be abstractly considered a generic method of organizing human activity divorced from its specific technology environment.

Exemplary System Architecture

Figure 1B:
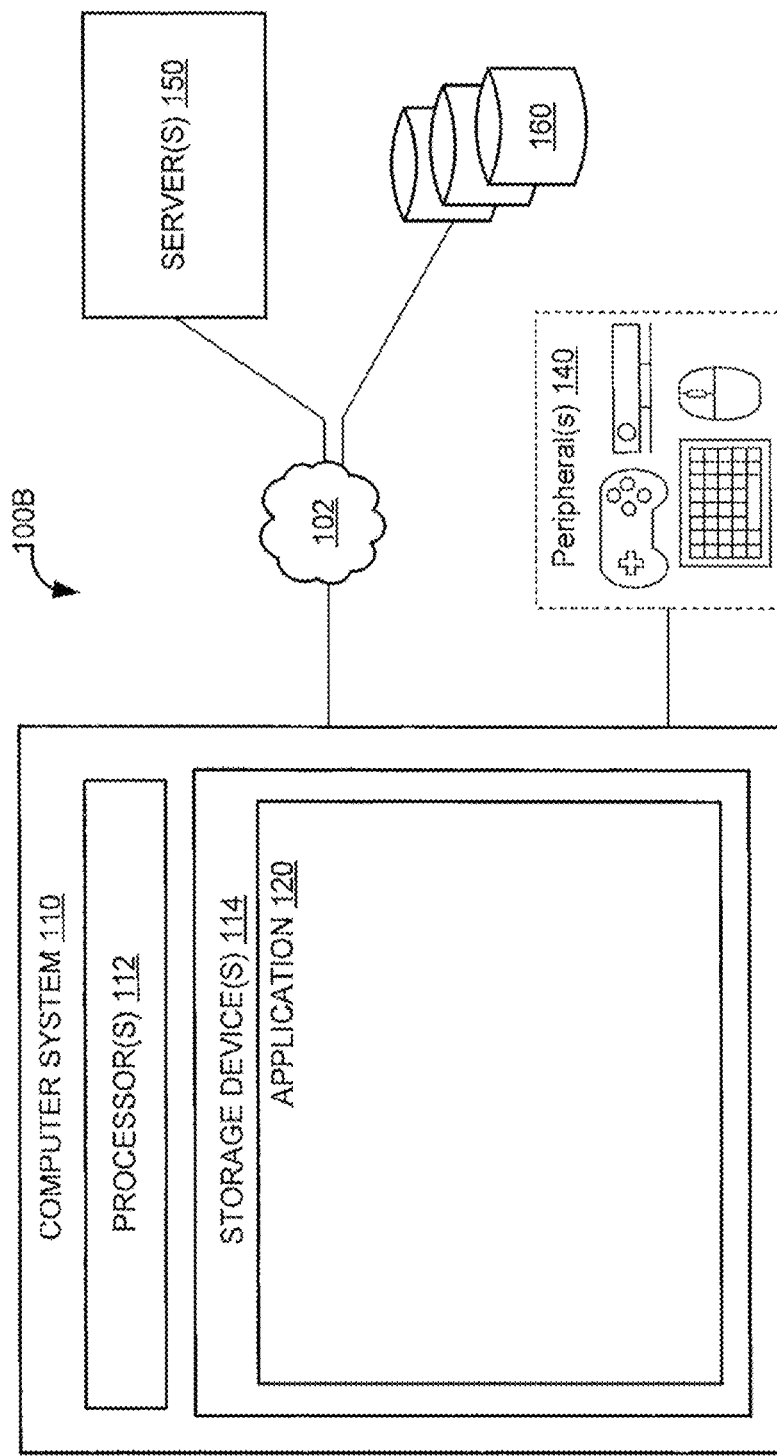
FIG. 1B is a block diagram of another system for providing multiplayer video games, according to one implementation of the present specification.

FIGS. 1A and 1B illustrate systems for providing multiplayer video games, according to some implementations of the present specification, referred to as a multiplayer game environment or multiplayer gaming environment. FIG. 1A illustrates an implementation in which server(s) 150 function as a host computer that hosts gameplay between other devices, such as computer system(s) 110. FIG. 1B illustrates an implementation in which a given computer system 110 functions as a host computer that hosts gameplay between (or with) other devices, such as other computer system(s) 110. Unless specifically stated otherwise, the description of various system components may refer to either or both of FIGS. 1A and 1B.

System 100 may be used to implement various embodiments described in subsequent sections of the present specification. For example, system 100 may implement various programs that result in greater performance by the players, better satisfaction with the play experience irrespective of the level of skill, result in greater satisfaction/enjoyment by the players, and/or otherwise will lead to positive gameplay outcomes for the players. In one implementation, system 100 may include one or more computer systems 110, one or more servers 150, one or more databases 160, and/or other components.

Computer system 110 may be configured as a gaming console, a handheld gaming device, a personal computer (e.g., a desktop computer, a laptop computer, etc.), a smartphone, a tablet computing device, a smart television, and/or other device that can be used to interact with an instance of a video game.

Referring to FIG. 1B, computer system 110 may include one or more processors 112 (also interchangeably referred to herein as processors 112, processor(s) 112, or processor 112 for convenience), one or more storage devices 114 (which may store one or more applications 120), one or more peripherals 140, and/or other components. Processors 112 may be programmed by one or more computer program instructions. For example, processors 112 may be programmed by application 120 and/or other instructions (such as gaming instructions used to instantiate the game).

Depending on the system configuration, application 120 (or portions thereof) may be part of a game application, which creates a game instance to facilitate gameplay. Alternatively or additionally, application 120 may run on a device such as a server 150 to perform its designated function(s) for users in an "online" game hosted by server 150.

Application 120 may include instructions that program computer system 110, each of which are described in greater detail herein. As used herein, for convenience, the various instructions will be described as performing an operation, when, in fact, the various instructions program the processors 112 (and therefore computer system 110) to perform the operation.

Peripherals 140 may be used to obtain an input (e.g., direct input, measured input, etc.) from a player. Peripherals 140 may include, without limitation, a game controller, a gamepad, a keyboard, a mouse, an imaging device such as a camera, a motion sensing device, a light sensor, a biometric sensor, and/or other peripheral device that can obtain an input from and/or relating to a player. Peripherals 140 may be coupled to a corresponding computer system 110 via a wired and/or wireless connection.

Server 150 may include one or more computing devices. Referring back to FIG. 1A, Server 150 may include one or more physical processors 152 (also interchangeably referred to herein as processors 152, processor(s) 152, or processor 152 for convenience) programmed by computer program instructions, one or more storage devices 154 (which may store a matchmaking application 120), and/or other components. Processors 152 may be programmed by one or more computer program instructions. For example, processors 152 may be programmed by gaming instructions used to instantiate the game.

Depending on the system configuration, application 120 (or portions thereof) may be part of a game application, which creates a game instance to facilitate gameplay. Alternatively, or additionally, portions or all of application 120 may run on computer system 110 or server 150. Application 120 may include instructions that program server 150 to perform various operations, each of which are described in greater detail herein. As used herein, for convenience, the various instructions will be described as performing an operation, when, in fact, the various instructions program the processors 152 (and therefore server 150) to perform the operation.

Although illustrated in FIGS. 1A and 1B as a single component, computer system 110 and server 150 may each include a plurality of individual components (e.g., computer devices) each programmed with at least some of the functions described herein. In this manner, some components of computer system 110 and/or server 150 may perform some functions while other components may perform other functions, as would be appreciated. The one or more processors (112, 152) may each include one or more physical processors that are programmed by computer program instructions. Thus, either or both server 150 and computer system 100 may function as a host computer programmed by application 120. The various instructions described herein are exemplary only. Other configurations and numbers of instructions may be used, so long as the processor(s) (112, 152) are programmed to perform the functions described herein.

Furthermore, it should be appreciated that although the various instructions are illustrated in FIGS. 1A and 1B as being co-located within a single processing unit, in implementations in which processor(s) (112, 152) includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) (112, 152) may be programmed by one or more additional instructions that may perform some or all of the functionality attributed herein to one of the instructions.

The various instructions described herein may be stored in a storage device (114, 154) which may comprise random access memory (RAM), read only memory (ROM), and/or other memory. The storage device may store the computer program instructions (e.g., the aforementioned instructions) to be executed by processor (112, 152) as well as data that may be manipulated by processor (112, 152). The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

FIG. 2A illustrates an exemplary system configuration 200A in which a server hosts a plurality of computer devices to facilitate a multiplayer game, according to an implementation of the present specification. In one implementation, one or more servers 150 (illustrated in FIGS. 1A and 1B) may host a number of computer systems 110 (illustrated as computer systems 110A, 110B, . . . , 110N) via a network 102. Each computer system 110 may include one or more peripherals (illustrated as peripherals 140A, 140B, . . . , 140N). In this manner, one or more servers 150 may facilitate the gameplay of different players using different computer systems 110 and/or otherwise provide one or more operations of application 120 (illustrated in FIGS. 1A and 1B).

In some instances, a given server 150 may be associated with a proprietary gameplay network system, such as, without limitation, the Sony PlayStation® Network, Microsoft Xbox Live®, and/or any other gameplay network system. In this implementation, a given computer system 110 may be associated with a particular type of gaming console. Other types of computer systems 110 using other types of gameplay networks may be used as well.

FIG. 2B illustrates an exemplary system configuration 200B in which a plurality of computer systems 110 are networked together to facilitate a multiplayer game, according to an implementation of the present specification. Any one or more of the computer devices 110 may serve as a host and/or otherwise provide one or more operations of application 120 (illustrated in FIGS. 1A and 1B).

FIG. 2C illustrates an exemplary system configuration 200C in which a computer system 110 is used by a plurality of users to facilitate a multiplayer game, according to an implementation of the present specification. In an implementation, computer system 110 may be considered to host the multiplayer game and/or otherwise provide one or more operations of application 120 (illustrated in FIGS. 1A and 1B).

Referring to FIGS. 2A-2C, simultaneously, in an implementation, a host may facilitate the multiplayer game by dynamically modifying the gaming environment and/or gaming parameters to suit the skill levels of one or more players within a gaming session, measuring a team's performance in a gaming session, using likeability factors between players as a factor to perform matchmaking, using social groups to modify gaming environments and/or gaming parameters to differently suit the requirements of each social group, and/or performing other operations described herein. In an implementation, at least some of these operations may also or instead be performed by one or more individual computer systems 110. Furthermore, the illustrated system configurations are exemplary only and should not be viewed as limiting in any way. Other system configurations may be used as well, as would be appreciated by those having skill in the art.

Content Customization Based on Player Skill Level

In a first implementation of the present specification, the system enables players of different skill levels to play together, in the same level of a gaming session, by providing players of different skill levels challenges tailored to their particular skill level. In embodiments, a multiplayer game environment is simulated by a computing system. The gaming parameters are adjusted within the gaming environment according to skill levels of the different players participating in the game. Adjustments result in each player in a team experiencing a different degree of difficulty or challenge while still experiencing the same content within the same level of the gameplay session and while still being able to cooperatively play as a team. In embodiments, the skill levels of the players are different for at least two or more players.

In an embodiment, a computer program that executes the gaming environment identifies a skill level of each player among the multiple players, and subsequently modifies one or more parameters of the game for each player amongst the multiple players. The skill level can be based on a variety of factors, including experience level, achievement within a game, in-game performance statistics (e.g., kill/death ratio, win/loss rate, etc.). In an embodiment, the computer program that executes the gaming environment automatically detects and tracks a player's skill-level (tracked skill traits) based on measurable session behaviour, such as but not limited to: time played, successful games won, times helping other players, weapon accuracy, favorite weapon usage, and number of games left. In another embodiment, teammates can rate each other for various subjective skill traits (assigned skill traits). The subjective rating could be such as but not limited to: expert sniper, great team player, and good leader. The computer program that executes the gaming environment may discern a higher skill-level for a player if the player has more votes for these traits in their career. In yet another embodiment, a combination of tracked skill traits and assigned skill traits is used to ascertain a player's skill-level. In an embodiment, each metric within the tracked skill traits and assigned skill traits are allocated weights in order to make balanced decisions.

The modification of the gaming parameters is based on the skill level of each player. In embodiments, the modification of gaming parameters is executed in real time during a gaming session. In embodiments, the modification of the gaming parameters are executed on a player-by-player basis, based on their skill levels, which may be different for different players. Therefore, the online multiplayer gaming environment generates a gaming environment within which two or more players can play cooperatively as a team within the same gaming environment of the same level of the same game and tailors the experiences in that gaming environment to the specific skill level of each player.

Figure 3A:
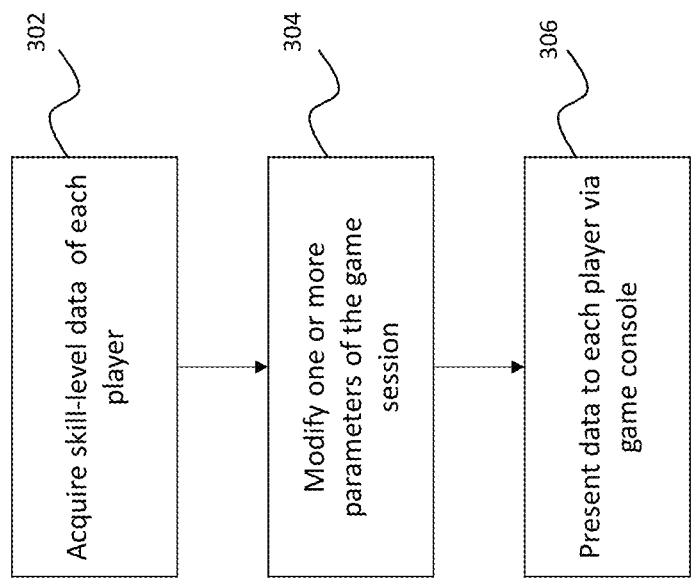
FIG. 3A is a flow diagram illustrating a method of determining a player's skill level and modifying a degree of difficulty of a gameplay session based on the acquired skill level, in accordance with an implementation of the present specification.

FIG. 3A is a flow diagram illustrating a method of determining a player's skill level and modifying a degree of difficulty of a gameplay session based on the acquired skill level, in accordance with an implementation of the present specification. At 302, data corresponding to a skill level of each player in the multiplayer gaming environment is acquired. In an embodiment, skill levels of players playing together in a single session of the multiplayer game are acquired and are known to the computing system. In an embodiment, data defining the skill level of a player is acquired from a database where the data has been pre-stored at an earlier stage, for example, at the time of registering for a game play session. In embodiments, the data defining the skill levels is based on tracked skill traits, assigned skill traits, a combination of the tracked and assigned skill traits, or any other. In another embodiment, each user is prompted to enter their skill level by answering a set of pre-defined questions. In another embodiment, a skill level of each player is assessed via one or more test gameplay scenarios which the player is prompted to play, in order to acquire the player's skill level.

At 304, a predefined set of parameters in the gameplay session are modified, based on the acquired skill level data of the players. In an embodiment, before a gameplay session begins, the computer program that executes the gaming environment assesses the overall skill level of the team, based on individual players' skill levels. In one embodiment, assessment of the overall skill level is based on a flexible set of attributes. In one embodiment, the assessment is based on the game, on a particular level of the game, or specific attributes within a particular level of the game. In one embodiment, the assessment may be based on an average skill level of all the players for the game. In some embodiments, a combination of one or more of the above-stated embodiments for assessing the overall skill level is used. If a particular level favors a particular type of play style, for example, attributes favoring that level may be weighted more heavily. In an example of a basketball game, each position may be weighted differently. For example, the skill for the point guard position may be based on the player's passing and dribbling attributes, while the skill for a center position may be determined based on the player's height, blocking ability, and strength.

Once an assessment is made, the computer program that executes the gaming environment modifies elements of the session and/or gameplay parameters as the session is being created based on the aggregate skill level. In embodiments, session modifications may include, but are not limited to: adjusting the number of enemies, adjusting the complexity of puzzles; and player adjustments, which may include the player's health, damage, speed, available abilities, and difficulty level. In one embodiment, a player's health is scaled based on the player's skill level by. At 306, data corresponding to acquired skill level of each player is generated and presented to a player via a game console, resulting in each player within a team experiencing a different degree of difficulty or challenge while still experiencing the same content in the same gameplay session.

FIG. 3B illustrates a table providing an exemplary list of parameters of a gameplay session that are modified based on a player's skill level and the corresponding experience for players of different skill levels. For example, in a first-shooter gaming environment, when a first player aims his weapon at a target, a parameter defining the tolerance for how accurate the player's aim must be to hit the target is modified based on the acquired skill level of the player. The computer assigns the tolerance for how accurate the player's aim must be to hit the target differently based on the skill level of the first player. A player having a higher skill level will be assigned a lower tolerance parameter and therefore, will have to be more accurate in aiming in order to hit the target. A player having a lower skill level be assigned a higher tolerance parameter and, therefore, could be less accurate in aiming in order to hit the target. As shown, column 310 of Table 1 lists modifiable parameters such as 'degree of accuracy required to hit a target', column 312 lists the experience of a player having a 'high' skill level, which may be 'high degree of accuracy required', column 314 lists the experience of a player having a 'medium' skill level, which may be 'medium degree of accuracy required', and column 316 lists the experience of a player having a 'low' skill level, which may be 'low degree of accuracy required'. Similarly, the table lists other modifiable parameters, such as 'likelihood of being targeted by enemy', where the experience of a player having a 'high' skill level may be 'high degree of likelihood', the experience of a player having a 'medium' skill level may be 'medium degree of likelihood', and the experience of a player having a 'low' skill level may be 'low degree of likelihood'. Another example parameter is 'difficulty of an in-game puzzle', where the experience of a player having a 'high' skill level may be 'high degree of difficulty', the experience of a player having a 'medium' skill level may be 'medium degree of difficulty', and the experience of a player having a 'low' skill level may be 'low degree of difficulty'. Another example parameter is 'bonus chance of finding powerful treasure', where the experience of a player having a 'high' skill level may be 'medium degree of chance', the experience of a player having a 'medium' skill level may be 'high degree of chance', and the experience of a player having a 'low' skill level may be 'very high degree of chance'. Yet another example parameter is 'number of challenging enemies in a single encounter', where the experience of a player having a 'high' skill level may be a high number, for example 10-20, the experience of a player having a 'medium' skill level may be a medium number, for example 5-10, and the experience of a player having a 'low' skill level may be a low number, for example 1-5. Still another example parameter is 'gold earned multiplier', where the earning of a player having a 'high' skill level may be 'high', for example 1.5×, the earning of a player having a 'medium' skill level may be 'medium', for example 1.25×, and the earning of a player having a 'low' skill level may be 'low', for example 1×. One more example parameter is 'friendly-fire damage amount to team-mates', where the experience of a player having a 'high' skill level may be 'high degree of damage', for example 100% of damage, the experience of a player having a 'medium' skill level may be 'medium degree of damage', for example 50% of damage, and the experience of a player having a 'low' skill level may be 'low degree of damage', for example 0% of damage.

One of ordinary skill in the art would understand that the skill-levels of players may not be on the scales listed above, but rather, any scale which quantifiably differentiates "high", "medium", and "low" by assigning a first value to high, a second value to medium and a third value to low, wherein each of the first, second, and third values are different and are quantifiably separated by an amount and indicative of a relatively high, medium, and low level of skill respectively. Furthermore, one of ordinary skill in the art would appreciate that the scale may be more incrementally divided into further categories, such as high-high, medium-high, medium-low, etc., each of which would be assigned a value, where each of the values are different, are quantifiably separated by an amount, and indicative of a relative difference in skill.

In embodiments, adjustments and/or modifications may be made for various play parameters during battles, healing, finding rewards, and other parameters. FIG. 3C illustrates a table providing an exemplary list of parameters of a gameplay session that are modified differently for different experiences by players based on a player's skill level. As shown, column 318 of Table 2 lists topics such as 'Equipment Selection', column 320 lists how modifications under the corresponding topic of column 318 are made for players with higher skill levels, and column 322 lists how modifications under the same topic of column 318 are made for players with lower skill levels. For example, the 'equipment selection' may call for modifications provided to high skill level players that involve access to numerous, complex equipment, whereas, modifications provided to low skill level players may involve access to fewer, simplified equipment. In an embodiment, the term "equipment" may include to mean any resources that are made available to a player, which is used by the player to play the game. Accordingly, a table, database, or other dataset includes an "equipment" entry, wherein a different value is separately assigned to each skill level and wherein each of the different values is associated with a number and/or complexity of equipment, with higher skill levels having values associated therewith a greater number and/or complexity of equipment and with lower skill levels having values associated therewith a lower number and/or complexity of equipment.

In another example, the 'accuracy of enemy attacks' may call for modifications provided to high skill level players that involve 'enemy attacks never missing the player', whereas, modifications provided to low skill level players may involve 'enemy attacks sometimes missing the player'. Accordingly, a table, database, or other dataset includes an "enemies attacks" entry, wherein a different value is separately assigned to each skill level and wherein each of the different values is associated with an accuracy of enemies attack, with higher skill levels having values associated therewith a greater accuracy of enemies attack and with lower skill levels having values associated therewith a lower accuracy of enemies attack.

In yet another example, the 'accuracy of player attacks' may call for modifications provided to high skill level players that involve higher or absolute precision in the attack to hit the enemy, whereas, modifications provided to low skill level players may allow player attacks having a generous leeway and may not need great precision to hit the enemy. Accordingly, a table, database, or other dataset includes a "player attacks" entry, wherein a different value is separately assigned to each skill level and wherein each of the different values is associated with a required accuracy of player attack towards an enemy to be able to hit the enemy, with higher skill levels having values associated therewith a greater required accuracy of player's attack and with lower skill levels having values associated therewith a lower required accuracy of player's attack.

In another example, the 'chance to find bonus treasure' may call for modifications provided to high skill level players that provide a higher chance, for example 80% chance, on session completion, whereas, modifications provided to low skill level players may provide a lower chance, for example 35% chance, on session completion. Accordingly, a table, database, or other dataset includes a "bonus treasure" entry, wherein a different value is separately assigned to each skill level and wherein each of the different values is associated with a probability of a player finding a bonus treasure, with higher skill levels having values associated therewith a greater probability of finding and with lower skill levels having values associated therewith a lower probability of finding.

In another example, the 'frequency of hints given to player in a session' may call for modifications provided to high skill level players that provide no hints, whereas, modifications provided to low skill level players may always provide hints. Accordingly, a table, database, or other dataset includes a "hints" entry, wherein a different value is separately assigned to each skill level and wherein each of the different values is associated with a frequency of a player being provided with hints, with higher skill levels having values associated therewith a lower frequency of hints and with lower skill levels having values associated therewith a higher frequency of hints.

In another example, the 'customization options' may call for modifications provided to high skill level players that a wide range of unique ways to customize character appearance, whereas, modifications provided to low skill level players may provide a limited range of ways to customize character appearance. Accordingly, a table, database, or other dataset includes a "customization" entry, wherein a different value is separately assigned to each skill level and wherein each of the different values is associated with a range of tools and options available to a player to enable customization of available resources including character appearance, with higher skill levels having values associated therewith a wider range with lower skill levels having values associated therewith a smaller range.

In another embodiment, the computer program that executes the gaming environment determines an average skill level of the entire team and subsequently assigns a skill-appropriate, pre-constructed, level session to the team. In some embodiments, the parameters of the gameplay session are averaged based on the aggregate skill-level of the entire team, such that each player is provided with a uniform session and/or gameplay parameters. For example, an aggregate skill level of the entire team is used to define a number of challenging enemies that each player will face in a single encounter. In this example, the number of challenging enemies may be modified to a number that is custom-calculated for the aggregate team skill-level and provided uniformly to each player. While in the previous embodiment, each player in a session is presented with a possibly different number of challenging enemies in a single encounter where the number of each player is based on their skill-level, in this embodiment, each player is presented with a uniform number of enemies in a single encounter where the number is based on the overall team average. Similarly, other session and/or gameplay parameters may be averaged based on the overall aggregate skill-level of the team.

Figure 3D:
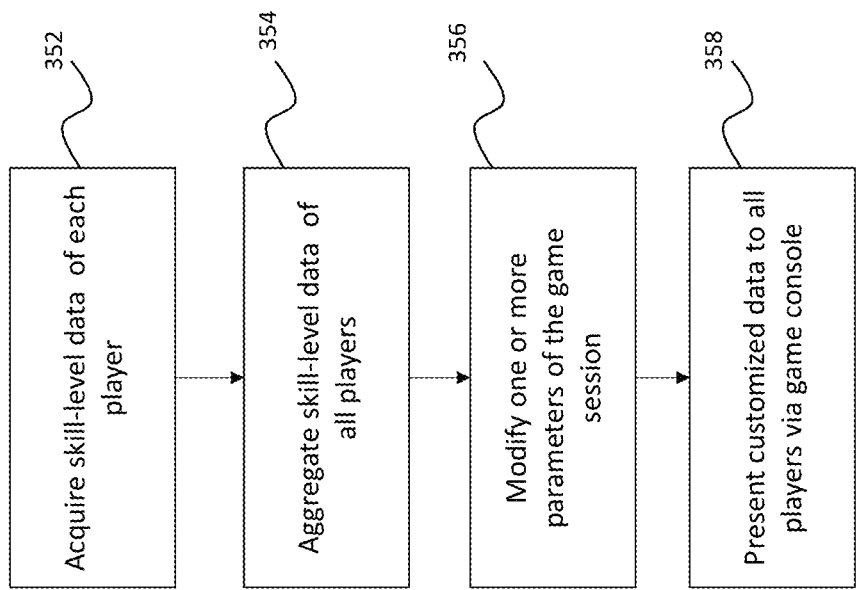
FIG. 3D is a flow diagram illustrating a method of determining a player's skill level and modifying a degree of difficulty of a gameplay session based on the acquired skill level, in accordance with another implementation of the present specification.

FIG. 3D is a flow diagram illustrating a method of determining a player's skill level and modifying a degree of difficulty of a gameplay session based on the acquired skill level, in accordance with another implementation of the present specification. At 352, data corresponding to a skill level of each player in the multiplayer gaming environment is acquired. In an embodiment, skill levels of players playing together in a single session of the multiplayer game are acquired and are known to the computing system. In an embodiment, data defining the skill level of a player is acquired from a database where the data has been pre-stored at an earlier stage, for example, at the time of registering for a game play session. In embodiments, the data defining the skill levels is based on tracked skill traits, assigned skill traits, a combination of the tracked and assigned skill traits, or any other. In another embodiment, each user is prompted to enter their skill level by answering a set of pre-defined questions. In another embodiment, a skill level of each player is assessed via one or more test gameplay scenarios which the player is prompted to play, in order to acquire the player's skill level.

At 354, the acquired skill-level data for each player is aggregated to arrive at an overall skill-level data for the combination of the players. At 356, a predefined set of parameters in the gameplay session are modified, based on the aggregate skill level data of the players. In some embodiments, the parameters of the gameplay session are averaged based on the aggregate skill-level of the entire team, such that each player is provided with a uniform session and/or gameplay parameters. In an embodiment, before a gameplay session begins, the computer program that executes the gaming environment assesses the overall skill level of the team, based on individual players' skill levels. In one embodiment, assessment of the overall skill level is based on a flexible set of attributes. In one embodiment, the assessment is based on the game, on a particular level of the game, or specific attributes within a particular level of the game. In one embodiment, the assessment may be based on an average skill level of all the players for the game. In some embodiments, a combination of one or more of the above-stated embodiments for assessing the overall skill level is used. If a particular level favors a particular type of play style, for example, attributes favoring that level may be weighted more heavily. In an example of a basketball game, each position may be weighted differently. For example, the skill for the point guard position may be based on the player's passing and dribbling attributes, while the skill for a center position may be determined based on the player's height, blocking ability, and strength.

Once an assessment is made, the computer program that executes the gaming environment modifies elements of the session and/or gameplay parameters as the session is being created based on the aggregate skill level. In embodiments, session modifications may include, but are not limited to: adjusting the number of enemies, adjusting the complexity of puzzles; and player adjustments, which may include players' health, damage, speed, available abilities, and difficulty level. In one embodiment, the players' health are scaled based on the aggregate skill level. At 358, data corresponding to aggregated skill level for all the players is generated and presented to the players via a game console, resulting in each player within a team experiencing a customized degree of difficulty or challenge within a content in the gameplay session. The degree of difficulty or challenge, or any other game parameter is customized for the team of players, based on their aggregate skill-level information.

As a result, instead of having people of the same level teaming up, embodiments of the present specification enable people of differing levels to work together within gameplay. Therefore, even though the players may all be in the same environment, the various parameters that define death and success, among others, will change depending on the player's skill level.

Incentivizing Team Cooperation

In a second implementation of the present specification, systems and methods are provided to encourage performance of a team or a group of players. In embodiments, a computer-implemented method is used in a multiplayer gaming environment to monitor actual gameplay in real time in order to determine a degree of cooperation provided individually by each player to the player's team members, as well as an overall degree of mutual cooperation between all the players in the team. The team performance may be then determined based on a function of the individual and/or overall degree of cooperation among the players of the team. In an exemplary embodiment, the determined team performance may be displayed to the team players during the course of the game and/or after a gaming session and rewards or benefits may be distributed based thereon. In embodiments, the team performance is calibrated within a range or over a scale. In some embodiments, reaching certain thresholds of team performance could provide tangible in-game benefits such as but not limited to temporarily increased power, or access to new abilities. In some embodiments, a measure of team performance could be used as a form of currency that players or team members can use to purchase unique in-game bonuses or treasure.

Figure 4A:
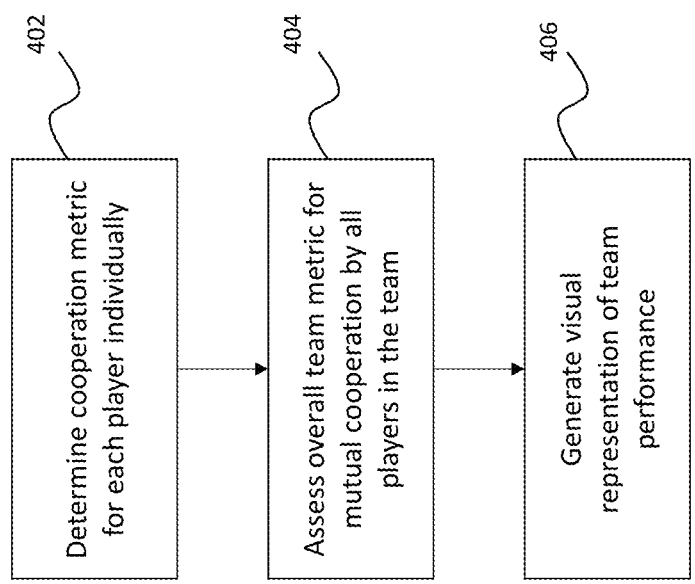
FIG. 4A is a flow diagram illustrating a method of encouraging cooperation between players of a team, who play together during a gaming session containing one or more levels.

FIG. 4A is a flow diagram illustrating a method of encouraging players of a team, who play together during a gaming session containing one or more levels. The team players are encouraged based on their degree of cooperation in the gameplay session, in accordance with an embodiment of the present specification. At 402, a cooperation metric corresponding to each player in the team is determined. The metric may indicate a level of cooperation provided by a player to one or more other players for the benefit of the team. In an embodiment, a negative cooperation metric is determined against a team player who performs an uncooperative action during a game play session.

At 404, an overall team metric is assessed. The overall team metric may be indicative of measure of a degree of cooperation among all the players in the team. In an embodiment, the overall team metric is assessed on the basis of individual cooperation metric determined for each player at 402. In some embodiments, an overall team metric is computed as a sum of points, which may be benchmarked at different intervals during a gameplay session. At step 406, a visual representation of the assessed overall team metric, assessed during a game play session, may be generated, as described below with respect to FIG. 5.

FIG. 4B is a table providing an exemplary list of actions, both cooperative and uncooperative, that may be performed by players of a team during a game play session and the corresponding cooperation metrics associated with each of the actions. As shown, in Table 3, column 410 provides an exemplary list of actions, both cooperative and uncooperative. Column 412 provides whether or not the corresponding action listed in column 410 was performed. Entries in column 412 may be marked as a 'yes' or a 'no'. Column 414 provides a cooperative metrics associated with the corresponding action listed in column 410. In embodiments, advantages may accumulate for a team for each cooperative action and consequences may accumulate against a team for each uncooperative action performed by any of the team's players. In an embodiment, ten points may be allotted to a team for each cooperative action performed by any of the team's players. For example, the column 412 entry associated with the action 'healing another player of the same team' is 'Yes' and the corresponding measure is '+5', provided in column 414, as shown in Table 3. In an embodiment, ten points may be deducted from a team for each uncooperative action performed by any of the team's players. In another example, the column 412 entry associated with the action 'sharing weapon with a team member' is 'No' and the corresponding measure is '0', provided in column 414. In another example, the column 412 entry associated with the action 'saving a team member's life' is 'Yes' and the corresponding measure provided in column 414 is '+25'. In another example, the column 412 entry associated with the action 'killing a team member' is 'Yes' and the corresponding measure provided in column 414 is '−50'. In another example, the column 412 entry associated with an action where several team mates contributes to defeating and enemy is 'Yes' and the corresponding measure provided in column 414 is '+15', which may be provided to each team member who was involved in the action. In another example, the column 412 entry associated with the action 'activating a coordinated team combo attack' is 'Yes' and the corresponding measure provided in column 414 is '+40'. In another example, the column 412 entry associated with the action 'completing level objectives alone' is 'No' and the corresponding measure provided in column 414 is '0'. In another example, the column 412 entry associated with the action 'completing level objectives with teammates' is 'Yes' and the corresponding measure provided in column 414 is '+10'. In another example, the column 412 entry associated with the action 'complimenting, praising, or positive gestures to other teammates' is 'Yes' and the corresponding measure provided in column 414 is '+5'. Accordingly, a table, database, or other dataset includes entries for various actions that may be performed, where the actions are indicative of cooperation between multiple players within a team. For each action performed, a corresponding entry may be created to indicate whether the action was performed in a manner that promotes team cooperation or vice versa. A value that contributes to the cooperation metrics may be assigned for each action that is performed. A different value may be assigned separately to one player or collectively to the multiple players of a team, based on that action and based on whether the performed action promotes team cooperation or vice versa. A positive value is assigned that increases the team metric, for actions promoting team cooperation; and no or a negative value is assigned that contributes negatively to the team metric, for actions that either do not promote or disrupt team cooperation.

Figure 5:
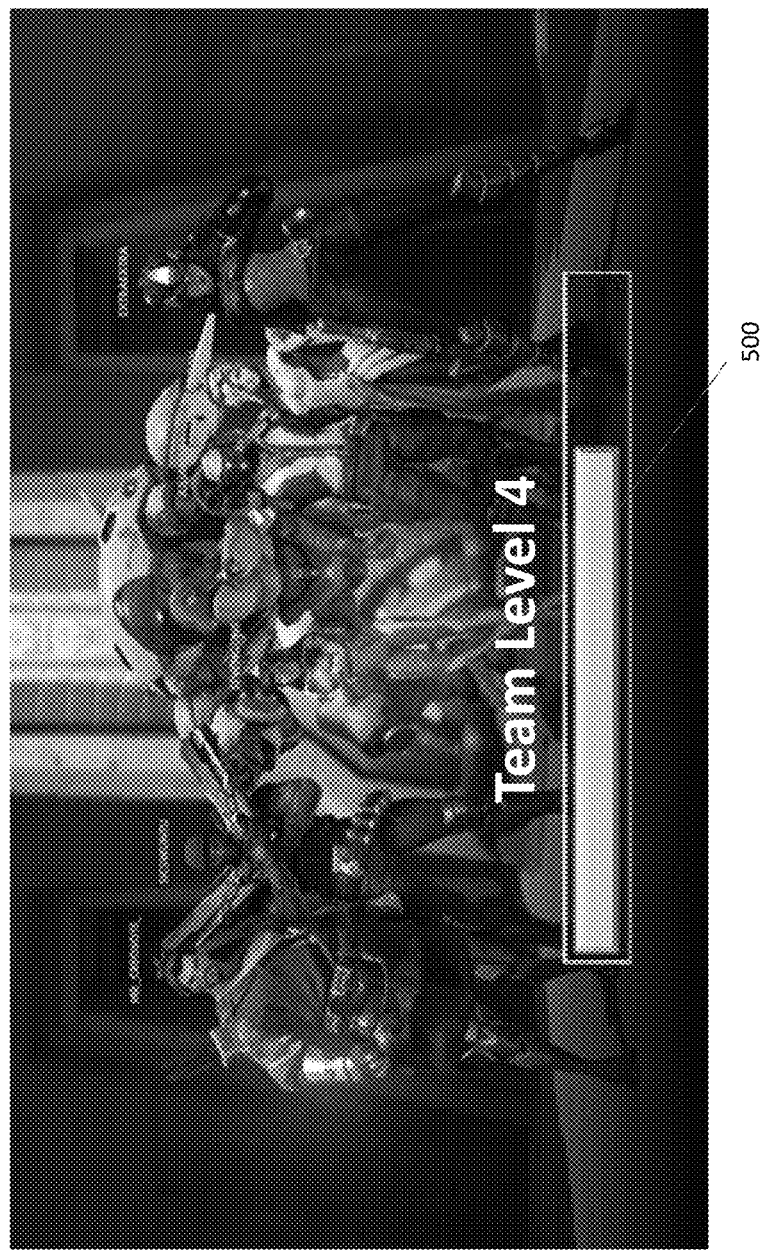
FIG. 5 is a screenshot displaying an overall team metric in the form of a meter or bar.

FIG. 5 is a screenshot displaying an overall team metric in the form of a meter or bar. Team performance and/or the degree of cooperation may be determined by monitoring interactive behavior between team members during the game and within the gaming environment, such as, but not limited to, one player giving items to another player; one player healing another player; working cooperatively with another player to terminate an enemy; working cooperatively to solve a puzzle or overcome an obstacle, or any other behavior including but not limited to those discussed in Table 3. Positive team behavior may be rewarded in various forms. In an embodiment, a high metric (number indicated by team meter 500) for overall team performance is rewarded with bonus points, additional weapons, or any other type of reward. If the opposite is true, the team meter may not change or may decrease. Different rewards may be associated with the team meter. In an exemplary embodiment, the team meter may be displayed to the team players during the course of the game and/or after a gaming session and rewards or benefits may be distributed based thereon. In some embodiments, reaching certain thresholds on the team meter may provide tangible in-game benefits such as but not limited to temporarily increased power or access to new abilities. In some embodiments, a measure on the team meter may be used as a form of currency that players or team members can use to purchase unique in-game bonuses or treasure. In an embodiment, rewards are disbursed gradually to the team members, where the entire team becomes proportionally stronger as the team meter increases. In alternative embodiments, rewards are disbursed immediately, where every time the team meter levels up, all teammates gain a powerful but temporary bonus to their weapon damage. In some embodiments, team meter rewards are accrued, where at the conclusion of a session, players can spend the team meter points to buy unique treasure, vanity outfits, or other benefits. Accordingly, a table, database, or other dataset includes entries for various threshold levels that may be achieved over a team meter, wherein a different value is separately assigned to each threshold level and wherein each of the different values is associated with a reward or a set of rewards for the team.

Improved Player Matching

In a third implementation of the present specification, systems and methods are provided to match players on the basis of common interests that encourage entertainment and therefore an ability of players to like the gaming environment. As used herein, the term "match" refers to a matching of two or more players, rather than a contest. For example, a potential match refers to a potential grouping of two or more players. Players are matched with people they've had fun with to nurture gaming friendships. The embodiments of the present specification offer player matching based on subjective variables, such as fun or likeability, so that habitual play may be encouraged and player retention is increased. The matching may be performed independent of other factors such as, a latency between players, a relative skill level, a presence of preferred players (e.g., clan mates or friends), a team composition, a time that a given player has been waiting to be matched (e.g., in a game lobby), or any other information used to assess a potential match.

In one embodiment, matchmaking is performed in real time at a peer-to-peer level through the use of a distributed application architecture. In this embodiment, the computer program in accordance with the present specification is programmed to match players who can potentially play a game together. In another embodiment, a central server is used to process and store matchmaking information. In some embodiments, a multitude of matchmaking servers that are geographically distributed within the central server architecture are used to process and store matchmaking information. The central server may be in communication with the one or more computing systems that deliver gaming environments to players. An application within a scoring engine in communication with the central server may obtain one or more match variables used to generate a match score for the potential match. In embodiments, a degree of likeability between two potential team players is used to determine a level of match between them. The degree of likeability may be in the form of the match variable that is based on at least two different types of variables. First, an explicit set of variables may be used to influence the match variable. The explicit set of variables may include, but may not be limited to, an indication of a positive thought or emotion towards another player. The indication may be provided in the form of a 'thumbs-up' sign by one player for another player, during or after a game play session, where the two players participated. If the player gives a 'thumbs up', then this is an express statement of likeability. In another example, predefine keywords or phrases picked up from spoken/typed chats may be an indication of a positive thought or emotion. Some exemplary keywords and phrases may include 'good', 'you played well', and 'congratulations'. In another example, a survey may be conducted to probe interest of various players. Results of the surveys may be used to determine likeability between different players who took the survey. In yet another example, any other impressions may be identified by the system in accordance with the present specification, to analyze the interest of the players and use it to determine a likeability between them. Second, an implicit determination of the degree of likeability may be made on the basis of various tracked parameters. If a player quit the game in less than a predefined amount of time, one may assume less likeability. If the players opt for same or similar music, or music from the same artist/genre, to listen to while playing, an increased likeability may be assumed. If the players, opt to buy same or similar item from the game store, an increased likeability may be assumed. If the players choose to watch the same games/gameplay sequences in replays, increased likeability may be assumed. If the players cooperated, increased likeability may be assumed. In an embodiment, a reading from the team meter is used to determine the degree of likeability between the players. If the players engaged in celebratory actions in the game or positive chatting, increased likeability may further be assumed. These variables can be used to adjust a matchmaking algorithm accordingly.

A given match variable may be assigned a coefficient that indicates a level of importance, or weight, of the given match variable. The scoring engine may generate a match score based on the match variables and their corresponding coefficients. In this manner, the scoring engine may consider multiple variables, each of which may be assigned with varying degrees of importance. In an embodiment, a score may be in the form of a percentage. A threshold score may be defined, which should be exceeded in order for a match to be indicated.

A game designer or others may assign a default value to a given coefficient based on the game designer's opinion of the relative importance of a corresponding match variable. The default value of a coefficient may be used unless it is changed. A coefficient may be tuned by changing its default value. Coefficients may be tuned in various ways, and by various parties, to respond to preferences, changing game conditions, and/or other information that may be available in real time during a gaming session. In this manner, the scoring engine may determine match scores based on dynamically changing information, and adjust the matchmaking process accordingly. For example, a player may tune coefficients by expressly indicating likeability towards another player during a gaming session. For example, a player may imply likeability towards another player by cheering them or engaging in positive chatting on a social media interface linked to the gaming environment during or after a gaming session. In examples, the likeability is determined towards any other player who may or may not be matching with a player in skills, gaming preferences, wait times, or any other information.

Figure 6A:
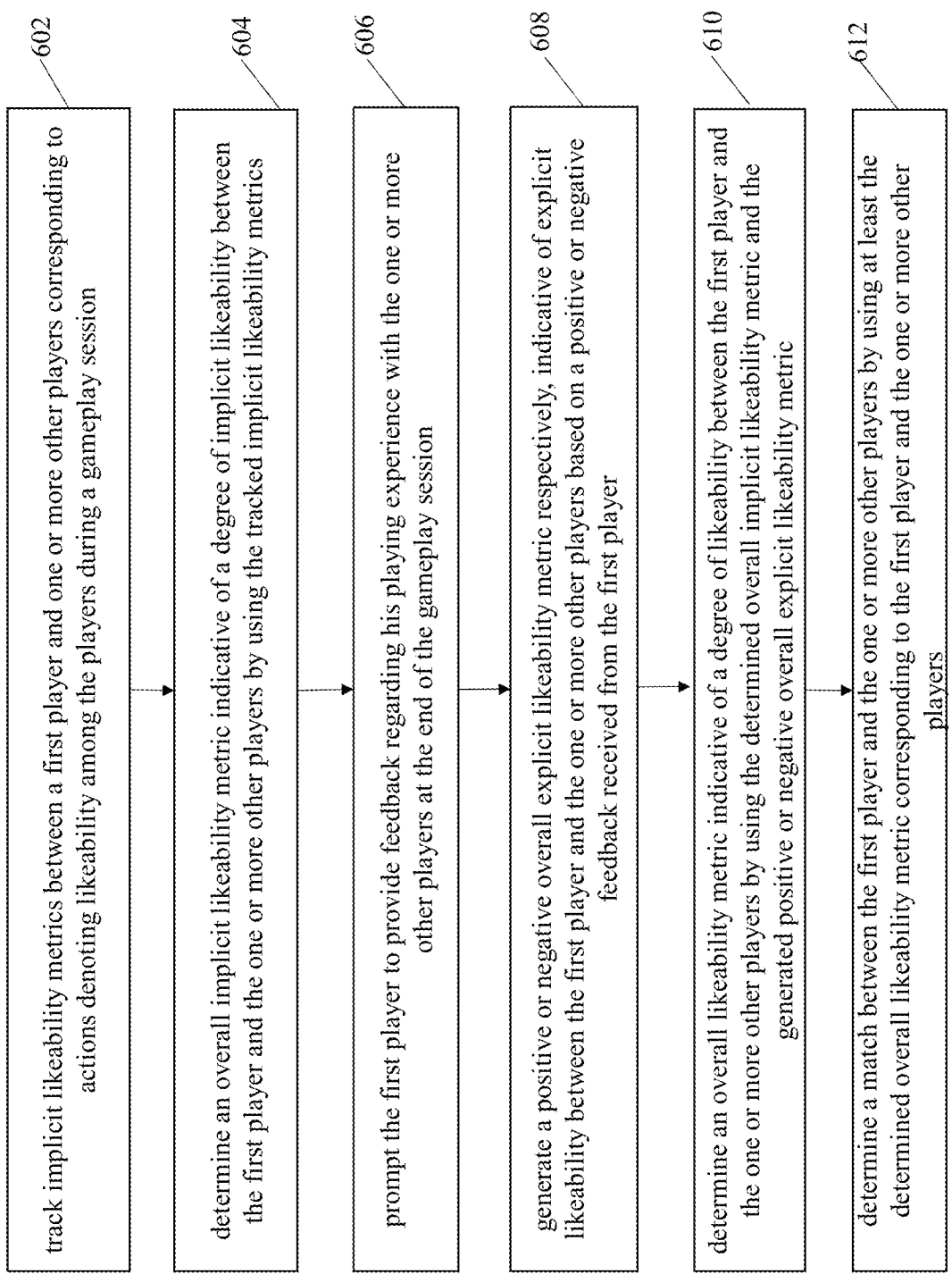
FIG. 6A is a flow diagram illustrating a method of determining a match between two or more players based on their explicit and implicit likeability metrics tracked throughout a game play session, in accordance with an implementation of the present specification.

FIG. 6A is a flow diagram illustrating a method of determining a match between two or more players based on their explicit and implicit likeability metrics tracked throughout a game play session, in accordance with an implementation of the present specification. At step 602, implicit likeability metrics between a first player and one or more other players corresponding to actions denoting likeability among the players during a gameplay session, are tracked. In embodiments, various actions/behavior of the first player during a game play session may be used to determine implicit likeability of the first player towards one or more players in the session.

FIG. 6B is a table providing a list of exemplary player action of a player during a gameplay session that may be used for determining likeability metrics with respect to at least one other player. As shown in Table 4, column 620 provides a list of actions taken by a first player during a gameplay session with one or more other players; while columns 622, 624 provide a list of positive or negative implicit likeability metrics associated with each listed action corresponding to a second player and a third payer respectively. It would be apparent that Table 4 is only an exemplary illustration and that various other player actions as well as a plurality of other players may be added to the table without departing from the scope of the present specification. For example, column 620 lists an action taken by the first player of quitting a gameplay session before finishing the session and columns 622, 624 list a negative likeability metrics associated with the action corresponding to both the second and the third player. Similarly, as column 620 lists an action taken by the first player of engaging in positive chatting during the gameplay session with the second player, column 622 lists a positive likeability metric associated with the action corresponding to the second player but column 624 lists a negative likeability metric associated with the action corresponding to the third player. As column 620 lists an action taken by the first player of co-operating with both the other players during the gameplay session, columns 622, 624 list a positive likeability metrics associated with the action corresponding to both the second and the third player. Further, as column 620 lists an action taken by the first player of engaging in celebratory behavior with both the other players during/or after the gameplay session, columns 622, 624 list a positive likeability metrics associated with the action corresponding to both the second and the third player.

At step 604, an overall implicit likeability metric indicative of a degree of implicit likeability between the first player and the one or more other players is determined by using the tracked implicit likeability metrics. In an embodiment, all the positive implicit likeability metric tracked between two players is summed to obtain the overall implicit likeability metric between the two players. In another embodiment, degrees of likeability may be recorder/listed in columns 622, 624 of Table 4 in terms of 'points', rather than just a positive or a negative metric. These points may then be summed to obtain an overall implicit likeability metric between two players.

At step 606, the first player is prompted to provide feedback regarding the player's gaming experience with the one or more other players at the end of the gameplay session. In an embodiment, the first player may be given an option of selecting a 'thumbs up' icon or a 'thumbs down' option to indicate the experience. In other embodiments, any other suitable method of taking player feedback may be employed.

At step 608 a positive or negative explicit likeability metric respectively, indicative of explicit likeability between the first player and the one or more other players is generated based on the positive or negative feedback received from the first player. For example, a 'thumbs up' icon selection made by the first player is recorded as a positive explicit likeability metric, while a 'thumbs down' icon selection made by the first player is recorded as a negative explicit likeability metric. In other embodiments, other actions of the player may also be used to generate the explicit likeability metric.

At step 610, an overall likeability metric indicative of a degree of likeability between the first player and the one or more other players is generated, by using the determined overall implicit likeability metric and the generated positive or negative overall explicit likeability metric. In an embodiment, a positive value is associated with each positive explicit/implicit metric obtained between two players, and the positive values are summed to obtain an overall likeability metric between the players.

At step 612, a match between the first player and the one or more other players is determined by using at least the determined overall likeability metric corresponding to the first player and the one or more other players. In an embodiment, one or more match making algorithms may be used to determine a match between two players based on their mutual likeability metric.

Content Generation from Social Networks

In a fourth implementation of the present specification, systems and methods are provided that create more meaningful social gaming networks by tailoring social content of the game based on ideas generated within the social group itself. In embodiments, a computer implemented method of integrating a social network into one or more gaming environments of a multi-player game is used to identify at least one social group comprising a group of players where the players have played together during one or more prior gameplay sessions of the multi-player game, customize content for each of the at least one social group, and provide customized content customized for a social group, to the players of the social group.

Figure 7A:
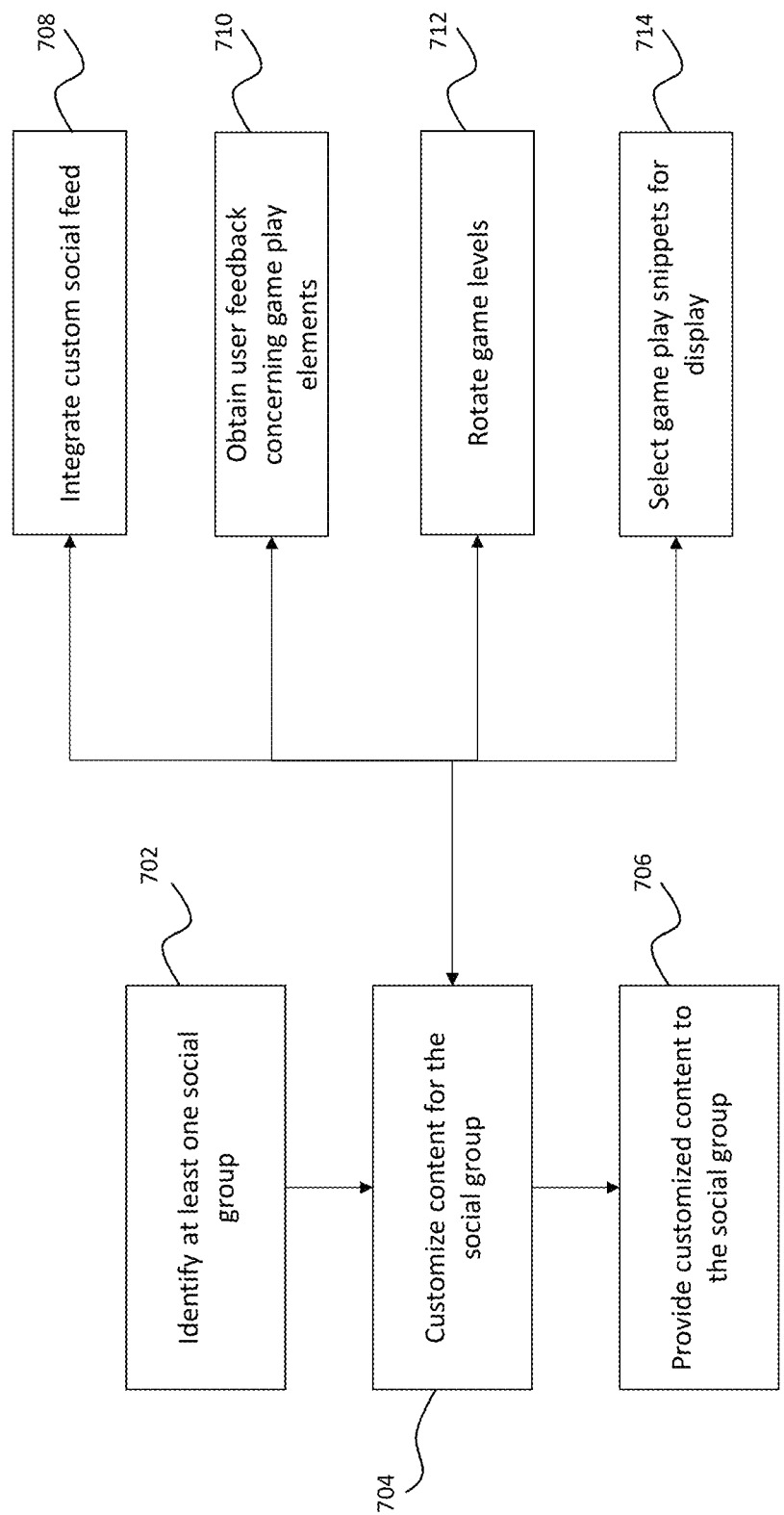
FIG. 7A is a flow diagram describing a method for implementing gaming social networks in accordance with some implementations of the present specification.

FIG. 7 is a flow diagram describing a method for implementing gaming social networks in accordance with some implementations of the present specification. At 702, a computer implemented method of integrating a social network into one or more gaming environments of a multi-player game is used to identify at least one social group comprising a group of players where the players have played together during one or more prior gameplay sessions of the multi-player game. At 704, content for each of the at least one social group is customized based on the data identified at 702. At 706, the customized content, customized for a specific social group, is presented to the players of the social group. The content may be customized in one or more of various methods.

A centralized social network tool may be provided that interfaces with and integrates into one or more gaming environments. In an embodiment, a central server communicates with multiple computing devices that provide the gaming environment to different players. In an embodiment, the centralized social network tool is implemented by the central server. The social network tool may be integral to the theme of the games and be pervasive within game play. In embodiments, members of the social network include actual players representing real people. At 708, a comment or a note sourced by any one player of a social group may be fed to the display of other players within the same group. For example, a social feed of a friend is integrated into the display of one or more other friends, where all friends are a part of a social group. The feed may be provided during a gaming session. In embodiments, the feed selected for display may be based on metrics or events that are relevant to the social group. Exemplary metric or events that trigger a social feed may include, but may not be limited to, actions such as new weapons unlocked, levels completed, and new members. Additionally, in an embodiment, content of the feed is tailored based on trending interests or recurring behaviors within the group.

Groups may include sets of members that have a dedicated space within the virtual network of the gaming environment, for posting content and/or communications. These spaces may be private (e.g., only open to members who are a part of the group) or public. Groups' memberships in a given group may be reflected in the member pages of the members that are a part of the given group. Social feeds by group's members may be displayed during game's progression.

In another aspect, at 710, the social network may be leveraged to obtain user feedback concerning game play elements. Content postings, member messages, and/or other interactions of members conveying information about gaming elements, including, but not limited to, gaming characters, weapon types, special powers, treasure, or any other gaming element, may be monitored. In embodiments, if the game accepts one or more suggestions, modifications corresponding to the accepted suggestions may be made to one or more gaming levels. Further, in embodiments, accepted suggestions that were provided within a specific social group may be used to modify one or more gaming levels for that group only. Therefore, different social groups may have different content in similar levels of the game, making the nature of the social group very meaningful.

FIG. 7B is a table providing a list of exemplary user feedback elements during or after a gameplay session that may be used for modifying one or more gaming levels. As shown in Table 5, column 730 provides a list of user feedback provided by more players over a social network; while column 732 provides a list of corresponding modifications to gameplay. It would be apparent that Table 5 is only an exemplary illustration and that various other types of user feedback and corresponding modifications may be added to the table without departing from the scope of the present specification. For example, column 730 lists an element of user feedback that members are playing the same level repeatedly, and column 732 provides a possible corresponding modification in the form of incentivizing a new level by providing special rewards on completion of new level. In another example, feedback is detected in the form of a post from a member stating that the member has earned a new, rare special weapon during gameplay, and correspondingly a modification is provided by providing a higher probability to all other members to receive this same weapon. In another example, feedback is detected from one or more members who repeatedly fail a particular mission, and complain about it in messages and posts, and in response a modification is made where the mission becomes offered at a lower difficulty, with slightly reduced rewards.

In another aspect, at 712, the game may rotate levels in and out of the game over time and differently for different social groups. Therefore, different social groups may have different levels available to them at any one time. In embodiments, gaming content is customized on the basis of characteristics of a social group. In embodiments, both the content and a sequence of one or more gaming levels of the multi-player game are customized. A combination of one or more group characteristics may be utilized to determine levels that may be offered to the group. In an embodiment, if a group is continuously struggling to complete a task or is finding the levels too easy, the social network tool may provide an indication, and correspondingly additional levels may be included and adjusted to a certain difficulty. In another embodiment, if a group has not used a certain game mode, used a particular item during gameplay, or relies too much on a particular strategy, the gaming content is customized for that group in the form of additional or modified levels with unique incentives and styles unfamiliar to the group. In another embodiment, if a group is lapsing or losing interest in the game, the gaming content is customized for that group by offering levels with highly unique and special rewards to retain engagement. In another embodiment, if a group member shares with the group an activity that they performed, the gaming content is customized for the entire group in order to suggest similar levels that feature this activity for other members of the group to attempt.

In another aspect, at 714, game play snippets are selected from a level of the multi-player game played by players of the social group. In embodiments, the selected snippets are presented to the players of the social group. The selected snippets may be displayed after the corresponding level, of which the snippets are used, of the gaming session. In embodiments, the snippets are displayed when going between levels. In an embodiment, the snippet may be a wrap-up video that summarizes what happened in the last levels. The game may incorporate actual game play snippets, such as those corresponding to crucial moves by the players in the last level, into that wrap-up video. The game progresses differently for each group of players, making each social group's wrap-up video different.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A computer-implemented method for encouraging team performance in a multiplayer game environment in a game for multiple players where the multiple players form the team, the method being implemented in a computer having a processor and a random access memory, wherein the processor is in data communication with a display and with a storage unit, the method comprising:

for each of the multiple players playing a video game in the multiplayer video game environment, identifying cooperative actions and uncooperative actions, wherein said cooperative and uncooperative actions include at least one of healing another player, sharing a weapon, saving another player's life, killing a teammate, working with a teammate to kill an enemy, working with a teammate to attack an enemy, completing level objectives alone, completing level objectives with a teammate, complimenting, praising or positively gesturing to teammates, giving items to another player, working with another player to solve a puzzle, or working with another player to overcome an obstacle;

for each of the identified cooperative actions, assigning a value indicative of a degree of cooperation;

for each of the identified uncooperative actions, assigning a value indicative of a degree of a lack of cooperation;

determining, by the computer and for each player of the multiple players, a cooperation metric representative of the values indicative of the degree of cooperation and the degree of the lack of cooperation;

assessing, by the computer, an overall team metric comprising cooperation metrics provided collectively by the multiple players that form the team, wherein the overall team metric is determined based on a function of all of the cooperation metrics provided by each of the multiple players; and generating, by the computer, a visual representation of team performance based on the overall team metric.

2. The method of claim 1 wherein the determining comprises determining a degree of items given by at least one player to at least one other player in the team.

3. The method of claim 1 wherein the determining comprises determining a degree of cooperation extended by at least one player to at least one other player in the team to defeat an enemy in the game.

4. The method of claim 1 wherein the determining comprises determining a degree of cooperation extended by at least one player to at least one other player in the team to overcome an obstacle in the game.

5. The method of claim 1 wherein the determining comprises determining a degree of cooperation extended by at least one player to at least one other player in the team to solve a problem in the game.

6. The method of claim 1 wherein the assessing further comprises rewarding the team based on the overall team metric.

7. The method of claim 6 wherein the rewarding comprises providing at least one of bonus points, additional weapons, and game benefits, to the team.

8. The method of claim 1, wherein the overall team metric is determined at different intervals during a gameplay session.

9. A system for encouraging team performance in a multiplayer game environment in a game for multiple players where the multiple players form the team, the system comprising: a computer having a processor and a random access memory, wherein the processor is in data communication with a display and with a storage unit, the computer configured to:
- for each of the multiple players playing a video game in the multiplayer video game environment, identify cooperative actions and uncooperative actions, wherein said cooperative and uncooperative actions include at least one of healing another player, sharing a weapon, saving another player's life, killing a teammate, working with a teammate to kill an enemy, working with a teammate to attack an enemy, completing level objectives alone, completing level objectives with a teammate, complimenting, praising or positively gesturing to teammates, giving items to another player, working with another player to solve a puzzle, or working with another player to overcome an obstacle;
- for each of the identified cooperative actions, assign a value indicative of a degree of cooperation;
- for each of the identified uncooperative actions, assign a value indicative of a degree of a lack of cooperation;
- for each player of the multiple players, determine a cooperation metric representative of the values indicative of the degree of cooperation and the degree of the lack of cooperation;
- assess an overall team metric comprising cooperation metrics provided collectively by the multiple players that form the team, wherein the overall team metric is determined based on a function of all of the cooperation metrics provided by each of the multiple players; and
- generate a visual representation of team performance based on the overall team metric.

10. The system of claim 9 wherein the determining comprises determining a degree of items given by at least one player to at least one other player in the team.

11. The system of claim 9 wherein the determining comprises determining a degree of cooperation extended by at least one player to at least one other player in the team to defeat an enemy in the game.

12. The system of claim 9 wherein the determining comprises determining a degree of cooperation extended by at least one player to at least one other player in the team to overcome an obstacle in the game.

13. The system of claim 9 wherein the determining comprises determining a degree of cooperation extended by at least one player to at least one other player in the team to solve a problem in the game.

14. The system of claim 9 wherein the assessing further comprises rewarding the team based on the overall team metric.

15. The system of claim 14 wherein the rewarding comprises providing at least one of bonus points, additional weapons, and game benefits, to the team.

16. A computer readable non-transitory medium comprising a plurality of executable programmatic instructions wherein, when said plurality of executable programmatic instructions are executed by a processor, a process for encouraging team performance in a multiplayer game environment in a game for multiple players where the multiple players form the team, is performed, said plurality of executable programmatic instructions comprising:
- programmatic instructions, stored in said computer readable non-transitory medium, for identifying cooperative actions and uncooperative actions for each of the multiple players playing a video game in the multiplayer video game environment, wherein said cooperative and uncooperative actions include at least one of healing another player, sharing a weapon, saving another player's life, killing a teammate, working with a teammate to kill an enemy, working with a teammate to attack an enemy, completing level objectives alone, completing level objectives with a teammate, complimenting, praising or positively gesturing to teammates, giving items to another player, working with another player to solve a puzzle, or working with another player to overcome an obstacle;
- programmatic instructions, stored in said computer readable non-transitory medium, for assigning a value indicative of a degree of cooperation for each of the identified cooperative actions;
- programmatic instructions, stored in said computer readable non-transitory medium, for assigning a value indicative of a degree of a lack of cooperation for each of the identified uncooperative actions;
- programmatic instructions, stored in said computer readable non-transitory medium, for determining, for each player of the multiple players, a cooperation metric representative of the values indicative of the degree of cooperation and the degree of the lack of cooperation;
- programmatic instructions, stored in said computer readable non-transitory medium, for assessing an overall team metric comprising cooperation metrics provided collectively by the multiple players that form the team, wherein the overall team metric is determined based on a function of all of the cooperation metrics provided by each of the multiple players; and
- programmatic instructions, stored in said computer readable non-transitory medium, for generating a visual representation of team performance based on the overall team metric.

17. The computer readable non-transitory medium of claim 16 wherein the determining comprises determining a degree of items given by at least one player to at least one other player in the team.

18. The computer readable non-transitory medium of claim 16 wherein the determining comprises determining a degree of cooperation extended by at least one player to at least one other player in the team to defeat an enemy in the game.

19. The computer readable non-transitory medium of claim 16 wherein the determining comprises determining a degree of cooperation extended by at least one player to at least one other player in the team to overcome an obstacle in the game.

20. The computer readable non-transitory medium of claim 16 wherein the determining comprises determining a degree of cooperation extended by at least one player to at least one other player in the team to solve a problem in the game.

21. The computer readable non-transitory medium of claim 16 wherein the assessing further comprises rewarding the team based on the overall team metric.

* * * * *